(12) United States Patent
Turner, III

(10) Patent No.: US 6,947,218 B2
(45) Date of Patent: Sep. 20, 2005

(54) FABRY-PEROT ETALON WITH INDEPENDENTLY SELECTABLE RESONANCE FREQUENCY AND FREE SPECTRAL RANGE

(75) Inventor: Nelson C. Turner, III, Longmont, CO (US)

(73) Assignee: Research Electro-Optics, Inc., Boulder, CO (US)

( * ) Notice: Subject to any disclaimer, the term of this patent is extended or adjusted under 35 U.S.C. 154(b) by 0 days.

(21) Appl. No.: 10/233,009

(22) Filed: Aug. 30, 2002

(65) Prior Publication Data

US 2004/0042083 A1 Mar. 4, 2004

(51) Int. Cl.[7] ............................................... G02B 5/28
(52) U.S. Cl. ...................... 359/589; 359/260; 359/584; 356/519
(58) Field of Search ................................. 359/260, 577, 359/580, 582, 583, 584, 589, 359, 360; 356/519

(56) References Cited

U.S. PATENT DOCUMENTS

| | | | |
|---|---|---|---|
| 4,204,771 A | 5/1980 | Shull et al. | 356/346 |
| 4,756,602 A | 7/1988 | Southwell et al. | 350/166 |
| 4,813,756 A | 3/1989 | Frenkel et al. | 350/96.18 |
| 5,037,180 A | 8/1991 | Stone | 385/123 |
| 5,212,584 A | 5/1993 | Chung | 359/260 |
| 5,291,332 A | 3/1994 | Siebert | 359/589 |
| 5,400,179 A | 3/1995 | Ito | 359/588 |
| 5,410,431 A * | 4/1995 | Southwell | 359/580 |
| 5,719,989 A * | 2/1998 | Cushing | 359/589 |
| 5,781,268 A | 7/1998 | Liu et al. | 349/198 |
| 5,798,859 A | 8/1998 | Colbourne et al. | 359/247 |
| 5,828,689 A | 10/1998 | Epworth | 372/98 |
| 5,926,317 A | 7/1999 | Cushing | 359/588 |
| 5,999,320 A | 12/1999 | Shirasaki | 359/577 |
| 6,005,995 A | 12/1999 | Chen et al. | 385/24 |
| 6,154,318 A | 11/2000 | Austin et al. | 359/584 |
| 6,169,626 B1 | 1/2001 | Chen et al. | 359/279 |

(Continued)

FOREIGN PATENT DOCUMENTS

| | | | |
|---|---|---|---|
| EP | 1 098 212 A1 | 5/2001 | G02B/6/293 |
| WO | WO/00/25154 | 5/2000 | G02B/5/08 |

OTHER PUBLICATIONS

Hect (1987) "The Fabry–Perot Interferometer" Optics, 2$^{nd}$ Ed., Addison–Wesley Publishing Co., pp. 368–372.

Moore et al. (1989) "Building Scientific Apparatus," Optics, Addison–Wesley Publishing Co., pp. 242–251.

International Search Report for International Application No. PCT/US03/26771 (FORM PCT/ISA/210), May 4, 2004.

*Primary Examiner*—Mark A. Robinson
*Assistant Examiner*—Alessandro Amari
(74) *Attorney, Agent, or Firm*—Greenlee, Winner & Sullivan, P.C.

(57) ABSTRACT

The invention relates generally to optical interference filters and interferometers. Methods, devices and device components for optical signal generation and processing using optical interference filters and interferometers are presented. The invention provides optical interference filters and interferometers having a selected cumulative reflectance phase dispersion capable of providing substantially independent selectable resonance frequency and free spectral range. An exemplary interference filter of the present invention provides a multi-peak transmission spectrum with substantially independent, selectable control over absolute transmission band frequencies and relative transmission band spacing. The methods and devices provided herein are particularly well suited for frequency matching optical signals to a selected frequency standard, such as the International Telecommunication Union frequency standard.

57 Claims, 5 Drawing Sheets

U.S. PATENT DOCUMENTS

| | | | |
|---|---|---|---|
| 6,186,937 B1 | 2/2001 | Ackerman et al. | 506/352 |
| 6,201,907 B1 | 3/2001 | Farries | 385/24 |
| 6,208,444 B1 | 3/2001 | Wong et al. | 359/127 |
| 6,222,673 B1 | 4/2001 | Austin et al. | 359/584 |
| 6,241,397 B1 | 6/2001 | Bao et al. | 385/73 |
| 6,263,128 B1 | 7/2001 | Huang | 385/24 |
| 6,275,322 B1 | 8/2001 | Tai | 359/279 |
| 6,317,251 B1 | 11/2001 | Wang | 359/318 |
| 6,320,663 B1 | 11/2001 | Ershov | 356/454 |
| 6,373,620 B1 | 4/2002 | Wang | 359/315 |
| 6,379,984 B1 | 4/2002 | Sandberg et al. | 438/29 |
| 6,631,033 B1 | 10/2003 | Lewis | |
| 6,724,789 B2 * | 4/2004 | Vujkovic-Cvijin | 372/32 |

* cited by examiner

FABRY-PEROT ETALON WITH INDEPENDENTLY SELECTABLE RESONANCE FREQUENCY AND FREE SPECTRAL RANGE

FIELD OF INVENTION

This invention relates generally to optical interference filters and devices and device components employing optical interference filters. In particular, the invention relates to Fabry-Perot optical interference filters with a selected cumulative reflectance phase dispersion capable of providing substantially independent, selectable resonance frequency and free spectral range, which are useful for frequency matching optical signals to a particular frequency standard.

BACKGROUND OF INVENTION

The Fabry-Perot (FP) interferometer has played a seminal role in the development of a number of scientific fields including atomic and molecular spectroscopy, material science, astronomy, lasers and optical communications. Fabry-Perot etalons are optical filters based on the FP interferometer. These filter are capable of providing extremely high resolution approaching tens of megaHertz at optical frequencies, very high light throughput and can comprise active optical components capable of fine wavelength tuning.

The FP etalon optical filter operates by multiple-beam interference of light reflected and transmitted by a pair of parallel, flat optical reflectors. In its most basic configuration, a FP etalon filter comprises an optical resonance cavity formed between two partially reflective, low loss reflectors. Typically, the resonance cavity is an air gap or a dielectric material having an optical path length equal to an integer multiple of one half the wavelength of light to be transmitted by the filter and the reflectors comprise dielectric stacks of alternating high and low refractive index layers. Such FP etalon designs have been used in both pulsed and continuous wave optical filtering applications and have been demonstrated to effectively filter light over the ultraviolet, visible and infrared spectral regions.

Light propagating through the FP etalon is partially transmitted and reflected upon every interaction with each reflector. The parallel optical configuration of the FP etalon provides for multiple reflections, which results in constructive and/or destructive interference depending on the wavelength of light propagating through the cavity. As a result of optical interference of reflected and transmitted beams, only certain frequencies of light are transmitted by the FP etalon filter. The transmitted frequencies correspond to the resonance frequencies of the etalon filter. Therefore, etalon transmission spectra typically comprise a plurality of transmission bands that are evenly separated from one another by the free spectral range of the etalon filter. The resonance frequency, free spectral range, light throughput and band width of transmission bands depend on several parameters including: (1) the optical path length of the resonance cavity, (2) the index of refraction and index dispersion of the cavity (3) reflectance of the reflectors and (4) extent of parallelism of the pair of reflectors. FP etalon filters of this type are extensively described in by Moore et al. in "Building Scientific Apparatus", Addison—Wesley Publishing Co, 1989, pgs 242–251 and Hect in "Optics, $2^{nd}$ Edition", Addison—Wesley Publishing Co, 1987, pgs. 368–372.

In long-haul telecommunication systems, optical signals are often generated from electronic signals, transported great distances along optical fiber networks and detected in a manner to regenerate the original electronic signal. While such telecommunication systems exploit the substantial efficiency gains of using optical methods for signal transmission, signal processing via standard electronic techniques remains a barrier to achieving the highest overall efficiency and accuracy of the telecommunication network. Specifically, the use of electronic components for signal processing often imposes substantial physical limitations on the speed that information can be transmitted and utilized. Accordingly, to fully realize the efficiency and accuracy possible in a purely optical telecommunication system, a need currently exists for optical communication technology capable of direct optical processing of telecommunication signals. Examples of such optical signal generation and processing applications include wavelength stabilization techniques, dispersion compensation methods and wavelength multiplexing techniques and are described in detail in U.S. Pat. Nos. 5,798,859, 6,208,444, 6,169,626 and 5,999,320.

Improvements in purely optical signal processing have focused on development of optical devices capable of all aspects of signal generation, processing and detection. These efforts include research into new optical devices that perform a variety of signal transmission and processing functions including signal amplification, beam splitting, signal coupling, optical filtering, multiplexing, demultiplexing optical switching and dispersion correction. High throughput optical filters with selectable transmission frequencies and bandwidth are essential components of a wide variety of such optical devices. FP etalon filters capable of providing these functions are of great importance to the development of highly efficient and accurate optical telecommunication systems.

Wavelength division multiplexing is used to increase the transmission capacity of fiber optic communication systems by allowing multiple wavelengths to be transmitted and received over a single optical fiber. In wavelength division multiplexing, a plurality of optical signals of different wavelength are multiplexed by coupling each signal to a common transmission line. The multiplexed transmission signal is then propagated over a single optical medium to a variety of receivers. When received, the (multiplexed transmission signal is demultiplexed into separate channels corresponding to individual wavelengths and detected by a receiver. Typically, signal demultiplexing is achieved by a variety of wavelength selective optical filtering devices including optical interference filters, cutoff filters, prisms and diffraction gratings. Although wavelength division multiplexing provides a simple, effective and low cost way of increasing transmission capacity, the feasibility of this technology is dependent on the development of high resolution, high throughput filters and transmitting lasers with highly stable and accurate frequencies.

Adoption of universal standard transmission channels for fiber optic transmission promotes efficient application of wavelength division multiplexing. The International Telecommunication Union (ITU) has adopted a standard channel definition providing a 45 channel system over a wavelength range of 1533 nm to 1565 nm with a uniform channel spacing of 100 GHz (approximately 0.8 nm). High resolution, high throughput optical filters capable of acting as a reference for the ITU standards are needed in the art.

The high throughput nature of FP etalon filters makes their use as optical frequency discriminators in devices that generate, detect or process optical signals especially attractive. While the periodic nature of the transmission spectra of FP etalon filters makes them ideally suited for wavelength discrimination in multiplex applications employing equally spaced transmission channels, their use is currently hampered by fundamental spectral limitations impeding accurate frequency matching of the transmission bands of a standard FP etalon filter with the transmission channels defined by the ITU frequency standard. These spectral limitations include the inability of FP etalon filters of the prior art to have the appropriate free spectral range and resonance frequency to overlap the transmission channels of the ITU frequency standard.

Both the free spectral range ($\Delta v$) of a FP optical filter and the resonance frequency (v) depend on the optical path length (L) of the resonance cavity and the cumulative reflectance phase dispersion of the reflectors. As a result, most FP etalon designs currently available do not provide independent and selectable control of free spectral range and resonance frequency. Rather, etalons in the prior art only provide independent selection of either one of these two variables. Unfortunately, these designs do not provide FP etalon filters with transmission spectra that match the channel spacing and position of the universally adopted ITU frequency standard.

The ability to selectively and independently control the resonance frequency and free spectral range of an etalon optical filter would aid tremendously in realizing the full potential of wavelength division multiplexing in optical telecommunication systems. First, FP etalon filters with transmission spectra selected to match the adopted transmission channels of the ITU frequency standard would provide a universally applicable frequency reference for distributed feedback lasers, which comprise an important optical source for telecommunications signaling. Specifically, these filters would possess the high resolution needed for laser frequency monitoring and control at all transmission frequencies of the ITU transmission channels, within the narrow tolerances needed for efficient signal multiplexing, which can approach 10–20 ppm.

Second, FP etalon filters with independently adjustable resonance frequency and free spectral range would provide frequency discriminators ideally suited for signal demultiplexing applications. In particular, these filters would allow selectable, high throughput transmission of light corresponding to one or more transmission channels in the ITU frequency grid. Such etalon optical filters would provide accurate wavelength discrimination and signal processing with minimal loss of signal.

Finally, FP etalon filters with independently adjustable resonance frequency and free spectral range would provide important means for correcting chromatic dispersion inherent, to wavelength multiplex signals that propagate over long fiber distances. Chromatic dispersion is caused by the dependence of the refractive index of silica on wavelength and causes different parts of the signal spectrum to arrive at the distant end of the system at different times. FP etalon filters can be used to compensate for chromatic dispersion because the optical frequency of any portion of the signal contains the information of the delay that has occurred.

U.S. Pat. No. 5,212,584 discloses a tunable etalon filter for wavelength division multiplex optical communication systems. Specifically, the etalon design disclosed is reported to provide selectable control of resonance frequency by employing a temperature controlled resonance cavity comprising a spacer composed of a material with a relatively large rate of change of refractive index with temperature. While the resonance frequency is reported to vary systematically with angle of incidence and cavity temperature, the etalon described in U.S. Pat. No. 5,212,584 does not provide substantially independent selectable resonance frequency and free spectral range. Therefore, selection of the resonance frequency of the etalon fixes the free spectral range to a set value. Accordingly, U.S. Pat. No. 5,212, 584 does not disclose methods of frequency matching the transmission bands of an etalon optical filter with the plurality of transmission channels or emission lines of a given frequency standard, such as the ITU frequency grid.

U.S. Pat. No. 5,291,332 discloses FP etalon designs having selected reflectance phase dispersion characteristics, which are reported to match aperiodic atmospheric spectral lines. The FP etalon design described employs reflectors having rugate coatings selected to achieve a prescribed reflectance phase dispersion. Specifically, the phase and frequency of the sinusoidal index of refraction profile of the rugate coating is selected to achieve the desired FP etalon transmission characteristics. While U.S. Pat. No. 5,291,332 reports successful frequency matching of the etalon transmission spectra and aperiodic atmospheric spectral lines, the reference does not disclose methods of frequency matching periodic spectral lines. Particularly, the reference does not disclose or suggest devices or methods capable of independently adjusting etalon resonance frequency and free spectral range while preserving a substantially periodic transmission spectrum. Further, the reference does not disclose techniques for frequency matching etalon transmission spectra and the evenly spaced transmission lines of given frequency standard or the evenly spaced lines of an optical source. Finally, the etalon design described in U.S. Pat. No. 5,291,332 employs costly rugate reflectors that are difficult to manufacture.

U.S. Pat. No. 6,154,318 discloses dispersive multilayer mirror structures that reportedly provide selectable reflectance group delay. Specifically, the authors report the use of a multilayer sequence of thin dielectric films to provide selectable adjustment of the reflectance group delay by using multiple resonance trapping techniques. Although the mirror structures disclosed are reported to provide reflection at selected frequencies, U.S. Pat. No. 6,154,318 does not disclose optical methods for frequency filtering employing Fabry-Perot interferometry. Further, the methods disclosed are limited to the use of multilayer mirror structures for pulsed optical source applications. Finally, the methods and devices disclosed by the authors to achieve the desired resonance trapping properties are limited to "resonant substructures arranged around layers less than one quarter-wavelength optical thickness."

It will be appreciated from the foregoing that a need exists for FP optical filters with independently selectable resonance frequency and free spectral range. The present invention provides high throughput FP etalon filters able to provide substantially independent selection of both resonance frequency and free spectral range. Further, the present invention provides FP etalon structures that are capable of frequency matching optical signals to the transmission channels of any selected frequency standard, particularly the International Telecommunications Union frequency standard.

SUMMARY OF THE INVENTION

This invention provides methods, devices, and device components for improving frequency discrimination and optical signal processing using optical interference filters and interferometers. In particular, the invention provides for optical interference filters and interferometers with selectable and adjustable cumulative reflectance phase dispersion. More specifically, this invention provides optical interference filters and interferometers having a multi-peak transmission profile with substantially independent, selectable control over absolute transmission band frequencies and relative transmission band spacing. Also provided are optical interference filters and interferometers, which are frequency matched to a selected frequency standard, particularly the International Telecommunication Union frequency standard.

An optical interference filter of the present invention comprises a FP etalon filter with substantially independent, selectable control of the resonance frequency and free spectral range. In this embodiment, the FP etalon filter has a selected cumulative reflectance phase dispersion, which provides the desired transmission characteristics. Specifically, selection of the cumulative reflectance phase dispersion provides accurate control of the resonance frequency and the free spectral range of the FP etalon filter. As a result of this functionally, an FP etalon filter of the present invention is capable of providing a multi-peaked transmission spectrum wherein the frequencies of transmission bands and the relative spacing between transmission bands are substantially independently selectable. In a preferred embodiment, the FP etalon filters of the present invention are capable of providing substantially periodic transmission bands. Specifically, this embodiment provides a reflection phase shift at each reflector that is substantially linear with respect to the frequency of incident radiation. Substantial linearity of the reflection phase shift with respect to frequency is achieved by providing reflectors that exhibit substantially constant reflectance as a function of frequency. Optical filters having periodically spaced transmission bands are beneficial because they may be frequency matched with the evenly spaced channels of a frequency standard or evenly spaced emission lines of a given optical source.

Alternatively, FP etalon filters of the present invention are capable of providing nonuniform, aperiodically spaced transmission bands. In this embodiment, the cumulative reflection phase shift at each reflector is substantially nonlinear with respect to frequency. Accordingly, the precise nonlinear dependency of the reflection phase shift with frequency is chosen to provide control over the frequency and spacing of each transmission band. Optical filters with aperiodic transmission bands are beneficial because they may be frequency matched to a frequency standard having unevenly spaced transmission channels or the unevenly spaced spectral lines of a light emitting source, particularly with various modes of a laser. Further, optical filters with aperiodic transmission bands are beneficial because they are capable of passing some, but not all, transmission frequencies of a given evenly spaced frequency standard.

In an exemplary embodiment, an optical interference filter of the present invention comprises a first partially reflective reflector and a second partially reflective reflector in optical communication with each other. The reflectors are positioned to intersect a propagation axis and are located in substantially parallel planes with respect to one another. The pair of reflectors form a resonance cavity along the propagation axis between the first and second reflector with a selectably, adjustable optical path length. In a preferred embodiment, the first reflector comprises a first sequence of thin dielectric layers comprising alternating high and low indices of refraction layers and an absentee layer. The second reflector comprises a second sequence of thin dielectric layers comprising alternating high and low indices of refraction layers. In this embodiment, optical thickness and composition of the absentee layer and the position of the absentee layer in the first sequence of thin dielectric layers is selectably adjustable to provide a selected cumulative reflectance phase dispersion of the FP etalon filter. In a preferred embodiment, the cumulative reflectance phase dispersion is selected from the range of about $1.0 \times 10^{-5}$ rad/GHz to about $1.0 \times 10^{-3}$ rad/GHz. In a more preferred embodiment, the cumulative reflectance phase dispersion is selected from the range of about $1.0 \times 10^{-5}$ rad/GHz to about $1.0 \times 10^{-4}$ rad/GHz. Particularly, the cumulative reflectance phase dispersion is selected to provide adjustable, substantially independent control over resonance frequency and free spectral range of the FP etalon filter. Accordingly, the present invention includes FP etalon filters in which the frequency of the transmission bands is selectable.

Alternatively, the first reflector of the present invention may comprise a sequence of thin dielectric layers comprising alternating high and low indices of refraction layers and a plurality of absentee layers. The number and composition of absentee layers and their positions in the sequence of thin dielectric layers is selectably adjustable to provide a selected cumulative reflectance phase dispersion of the FP etalon filter. The use of a plurality of absentee layers in the first sequence is beneficial because it provides more flexible and more continuous control of the cumulative reflectance phase dispersion of the optical filter. More flexible and smoother control of the cumulative reflectance phase dispersion results in a higher degree of independent control over the resonance frequency and free spectral range. Independent control of the position of the resonance frequency and transmission band spacing is beneficial because it aids considerably in precisely frequency matching the transmission bands of an optical filter to a given frequency standard.

In another embodiment, the second reflector of the present invention comprises a sequence of thin dielectric layers comprising alternating high and low indices of refraction layers and one or more absentee layers. The number and composition of absentee layers and position of one or more absentee layers in the sequence of thin dielectric layers in the second reflector may be selected so that the second reflector has the same reflectance phase dispersion as the first reflector. Alternatively, the second reflector may have a selected reflectance phase dispersion different from the first reflector. Use of a second reflector comprising absentee layers provides even greater control of the cumulative reflectance phase dispersion. Such flexible and smooth control of cumulative reflectance phase dispersion is beneficial because it provides greater control over the transmission characteristics of the etalon filter, namely substantially independent control of resonance frequency and free spectral range.

The interference filter of the present invention operates by multiple-beam interference of light reflected and transmitted by first and second partially reflective reflectors. Specifically, an incident light beam directed on to the optical interference filter undergoes partial reflection and partial transmission upon each interaction with the alternating high and low indices of layers comprising the first and second reflectors. The discrete beams formed undergo constructive or destructive interference as they translate through the optical filter. The nature and extent of the optical interference depends strongly on wavelength, resulting in a transmission profile characterized by a variety of transmission bands. The transmission bands of the etalon filter of the present invention may be periodic, wherein the bands are evenly spaced with respect to frequency. Alternatively, the transmission bands of the etalon filter of the present invention may be aperiodic, wherein the bands are unevenly spaced with respect to frequency.

In addition to interacting with the high and low indices of refraction layers, light propagating through the interference filter of the present invention also substantially interacts with at least one absentee layer. The presence of one or more absentee layers in the sequence of dielectric layers comprising the first reflector, second reflector or both does not substantially affect the extent of reflectance. The presence of one or more absentee layers does, however, significantly increase the cumulative reflectance phase dispersion of the etalon filter. Selection of the appropriate cumulative reflectance phase dispersion substantially affects the transmission characteristics of the optical filter, namely the free spectral range and the resonance frequency. Accordingly, the present invention includes FP etalon filters with a selected cumulative reflectance phase dispersion that results in selection and control of the etalon transmission characteristics.

The free spectral range of a FP optical filter comprising two identical cavity reflectors and with a reflection phase shift relative to the physical surface of the reflector of $\pi$ is determined by the expression:

$$\Delta v = \frac{c}{2nL + \frac{c}{2\pi}(\alpha_1 + \alpha_2)} \quad \text{I}$$

where $\Delta v$ is the free spectral range, c is the speed of light in a vacuum, L is the optical path length of the resonance cavity, n is the refractive index, $\alpha_1$ is the reflectance phase dispersion of the first reflector and $\alpha_2$ is the reflectance phase dispersion of the second reflector. The cumulative reflectance phase dispersion is defined as the sum of the reflectance phase dispersion of first and second reflectors:

$$\alpha_{cumulative} = \alpha_1 + \alpha_2 \quad \text{II}$$

The resonance frequency of such a FP etalon filter also depends on the optical path length of the resonance cavity and the cumulative reflectance phase dispersion and may be expressed by the equation:

$$v_m = \frac{c}{2nL + \frac{c}{2\pi}(\alpha_1 + \alpha_2)}\left(m - \frac{\Phi_1(v_c) - \alpha_1 v_c}{2\pi} - \frac{\Phi_2(v_c) - \alpha_2 v_c}{2\pi}\right) \quad \text{III}$$

where $v_m$ is the resonance frequency, m is the order, $\Phi_1$ is the reflection phase shift of the first reflector, and $\Phi_2$ is the reflection phase shift of the second reflector. $v_c$ is the center resonance frequency of each reflector, which may be selected from a distribution of etalon resonance frequencies positioned about the reflectance maximum of either reflector. $\Phi(v_c)$ is equal to $\pi$ for reflectors comprising an alternative sequence of high refractive index and low refractive index ¼ wave layers and diverges from a value of $\pi$ for non-¼ wave thin dielectric films.

Analytically, the system may be considered a relationship between two independent variables, $\Delta v$ and $v_m$ and two dependent variables, L and $\alpha_{cumulative}$. Although $\Delta v$ and $v_m$ are coupled due to the dependence of each on both dependent variables, $\Delta v$ exhibits a much stronger dependence on $\alpha_{cumulative}$ than does $v_m$. This is due to the presence of the phase dispersion terms ($\alpha_1$ and $\alpha_2$) in the numerator of equation III. Therefore, in practice $\Delta v$ and $v_m$ are substantially independent variables. Accordingly, the resonance frequency and free spectral range of the FP etalon of the present invention may be independently manipulated by the proper selection of the cumulative reflectance phase dispersion and resonance cavity length. The ability to control the cumulative reflectance phase dispersion via the presence of absentee layers in the thin film sequences comprising first and/or second reflectors provides an accurate means of independently adjusting the resonance frequency and free spectral range of the optical interference filter of the present invention.

The presence of one or more absentee layer increases the reflectance phase dispersion of the reflector, and, thus, determines the cumulative reflectance phase dispersion of the FP etalon filter. The magnitude of the increase in reflectance phase dispersion is controllable by varying (1) the number of absentee layers present in the sequence of thin dielectric layers, (2) the position of absentee layers in either sequence of thin dielectric layers, (3) the composition of one or more absentee layers and (4) the refractive index of one or more absentee layers. In practice, the number, optical thickness, composition and position of absentee layers required to achieve selected cumulative reflectance phase dispersion are determined empirically. Alternatively, the number, optical thickness, composition and position of absentee layer necessary to achieve a selected cumulative reflectance phase dispersion may be determined by numerical modeling methods. Such numerical modeling methods are well known in the art, such a The Essential Macleod, software written by Thin Film Center.

The optical interference filter of the present invention may be used with continuous and/or pulsed light sources. Light directed at the optical interference filter of the present invention may be oriented at an angle of incidence substantially normal to the plane containing the first partially reflective reflector. Alternatively, non-normal angles of incidence may be employed. Varying in the angle of incidence of light directed at the optical interference filter of the present invention is useful because it may substantially change the optical path length of the resonance cavity. Accordingly, the transmission properties of the etalon filter of the present invention may be tuned by variation of the angle of incidence of the incident light beam.

The first and second reflectors in the present invention may have the same or different reflectivities. Reflectivities useful for the present invention range from 0.05% to 100%. High reflectivity reflectors are beneficial because they provide optical interference filters with very high finesse, useful for high-resolution applications. Alternatively, low reflectivity reflectors are beneficial because they typically provide a more desirable discriminator slope for edge-locking applications. The first and second reflectors in the present invention may be composed of any combination of dielectric layers that exhibits at least partial reflectivity. In a preferred embodiment, the dielectric layers comprise thin dielectric films with alternative high and low refractive indices. In an exemplary preferred embodiment, the high or low index of refraction layers comprise thin metal oxide layers, including but not limited to $Ta_2O_5$, $SiO_2$, $HfO_2$, $MgF_2$, $CaF_2$, $TiO_2$ and $Nb_2O_5$. In addition, the first and second reflectors of the present invention may also have antireflection coatings on their exterior ends. Use of antireflection coatings is beneficial because it eliminates unwanted reflections and results in higher light throughput. Finally, the reflectors of the present invention may be any size or shape including but not limited to substantially wedged shape reflectors.

The resonance cavity of the present invention may be composed of any dielectric material. In an exemplary embodiment, the resonance cavity is a dielectric cavity layer of a selected optical thickness. Alternatively, an optical interference filter of the present invention comprises an air gap resonance cavity of selected optical path length, wherein the space between first and second filters is occupied by a selected pressure of one or more gases or by a substantial vacuum. In this embodiment, an air gap alignment spacer or kinematic mounting system is necessary to maintain a substantially constant optical path length through the resonance cavity for a given angle of incidence. Air gap resonance cavities are beneficial because they provide optical interference filters that are thermally stable. Thermal stability is desirable because it provides for very stable etalon transmission characteristics, namely resonance frequency and free spectral range. In addition, air gap resonance cavities are beneficial because they provide tunable etalon filters, wherein the refractive index and optical thickness of the cavity can be selectably adjusted by varying the partial pressure and identity of one or more gases in the cavity.

For a given angle of incidence, resonance cavities of the present invention may be of a substantially fixed, selected optical path length or may be of selectably, variable optical path length. Resonance cavities with a fixed optical path length may be beneficial because they are capable of providing a very stable optical path length for a given angle of incidence, and, thus provide very reproducible transmission spectra. Resonance cavities with a variable optical path length are beneficial because they are capable of providing tunable transmission characteristics. Specifically, interference filters of the present invention with a variable optical path length resonance cavity are capable of selectably adjusting the resonance frequency by variation of the optical path length.

Optical interference filters of the present invention may be used individually for frequency discrimination applications, such as wavelength division multiplexing and demultiplexing applications. Alternatively, series may be employed comprising a plurality of optical filters of the present invention in optical communication and positioned to intersect a common propagation axis. In an exemplary embodiment, FP filters of the present invention are aligned in series. The use of a plurality of interference filters is desirable because it may provide very high-resolution frequency discrimination.

The optical interference filters and interferometers of the present invention are capable of frequency matching an optical signal to a selected frequency standard. In a preferred embodiment, an optical interference filter of the present invention comprises a FP etalon filter having a well-characterized transmission spectrum comprising a plurality of transmission bands that substantially overlap one or more of the transmission channels and/or spectral lines of a given frequency standard. In another preferred embodiment, the etalon filter of the present invention has a transmission spectrum that is adjustable to pass only selected transmission channels and/or spectral lines of a given frequency standard. For example, a FP etalon filter of the present invention has a transmission spectrum that overlaps one or more selected transmission channels of the International Telecommunication frequency standard. In a preferred embodiment, the intersection of the frequency standard and transmission band occurs in a highly sloped region of the transmission band. Alternatively, a FP etalon filter of the present invention has a transmission spectrum that overlaps one or more spectral lines of a light emitting source, such as a laser or radiating body.

The present invention also comprises methods and devices for monitoring and tuning the frequency of optical sources. In this embodiment, incident light from an optical source is directed on a beam splitter and the reflected light is passed through an optical interference filter having a substantially independent selectable resonance frequency and free spectral range. As set forth above, the optical interference filter comprises a first and second reflector. The first reflector has an internal and external end and comprises a first sequence of thin dielectric layers comprising alternating high and low indices of refraction layers and at least one absentee layer. The second reflector is positioned a selected distance from the internal end of the first reflector and comprises a second sequence of thin dielectric layers comprising alternating high and low indices of refraction layers. Both reflectors are located in substantially parallel planes with respect to one another and form a resonance cavity there between. The number of absentee layers, their composition and their position in the first and second sequence of thin dielectric films is selected to provide a selected cumulative reflectance phase dispersion, which determines the precise transmission properties of the optical interference filter. Specifically, the cumulative reflectance phase dispersion is chosen such that only the desired frequencies of light are transmitted. Light passing through the optical interference filter is detected and monitored via a photodetector. Optionally, the devices and methods of the present invention may include a feedback means operationally coupled to the optical source and photodetector. Such means feedback means are well known in the art and may be configured to provide a means of maintaining a constant fraction of light from the light source having a wavelength within the transmission bands of the etalon filter.

In another exemplary embodiment, the present invention comprises a Gires—Tournois etalon filter (GT etalon) having substantially independent, selectable free spectral range and resonance frequency. The GT etalon filter of the present invention is particularly useful in wavelength division multiplexing applications, interleaver devices, deinterleaver devices and chromatic dispersion compensators. A preferred embodiment comprises a first partially reflective reflector comprising a first sequence of thin dielectric layers and a second highly reflective reflector comprising a second sequence of dielectric layers. A resonance cavity is formed between the two reflectors, which may be an air gap cavity or a dielectric layer cavity. The first and second sequences are comprised of alternating high refractive index layers and low refractive layers and one or more absentee layers. Such absentee layers may be positioned in the first sequence, second sequence or both to provide for a selected cumulative reflectance phase dispersion of the GT etalon. Specifically, the number, position and/or composition of the absentee layers are chosen to provide a substantially independent, selectable free spectral range and resonance frequency.

The GT etalon filter of the present invention operates by multiple-beam interference of light reflected and transmitted by first partial reflective reflector and second highly reflective reflector. Specifically, an incident light beam directed on to the GT etalon filter undergoes partial reflection and partial transmission upon interaction the first reflector. The transmitted portion propagates through the resonance cavity and substantially all the light is reflected by the second reflector. The plurality of beams formed undergoes constructive or destructive interference as they propagate in GT etalon. Importantly, the beams also interact with one or more absentee layers, which increase the cumulative reflectance phase dispersion experienced. Preferred increases in cumulative reflectance phase dispersion in the GT etalon filter of the present invention range from about $1.0 \times 10^{-6}$ rad/GHz to about 1.0×10⁻³ rad/GHz. More preferred increases in cumulative reflectance phase dispersion range from about 1.0× 10⁻⁶ rad/GHz to about 5.0×10⁻⁵ rad/GHz. In a preferred embodiment, the cumulative reflectance phase dispersion is selected to provide a selected phase dispersion, which establishes the transmission properties of the etalon filter.

The present invention includes methods for designing FP etalon filters with substantially independent selected resonance frequency and free spectral range. A preferred method of designing FP etalon optical filters with substantially independent selected resonance frequency and free spectral range comprises: (1) entering into a suitably-programmed computer a starting structure comprising a first reflector comprising a first sequence of thin dielectric films comprising alternating high and low refractive index layers and a second reflector comprising a second sequence of thin dielectric films comprising alternating high and low refractive index layers positioned a selected optical path length from the first reflector, (2) calculating the resonance frequencies and free spectral range associated with the starting structure, (3) adding one or more absentee layers to the first sequence of thin dielectric layers, second sequence of dielectric layers or both creating a first modified structure (4) calculating the cumulative reflectance phase dispersion, resonance frequencies and free spectral range associated with the first modified structure (5) modifying the position, optical thickness or composition of the absentee layer in the first sequence of thin dielectric films and/or adding additional absentee layers to either first or second sequence of thin dielectric films, thereby creating a new modified structure, (4) calculating the cumulative reflectance phase dispersion, resonance frequencies and free spectral range associated with the new modified structure, (5) optimizing the composition of the new modified structure to provide the desired resonance frequencies and free spectral range.

The invention is further illustrated by the following description, examples and drawings.

BRIEF DESCRIPTION OF THE DRAWINGS

FIG. 3 also illustrates a device for tuning the frequency of an optical source to a selected output frequency.

As illustrated in FIG. 4, the transmission bands of the FP etalon filter are frequency matched to the transmission channels of the frequency standard to provide an intersection point on the highly sloped region of the leading edge of the transmission band.

FIG. 5 is a comparison of the transmission spectra of the etalon filter of the present invention and two prior art designs. Etalon resonance frequencies are depicted as solid lines and the center frequencies of the ITU frequency standard are shown as dashed lines. FIG. 5C demonstrates that the etalon design of the present invention is capable of precise frequency matching to a plurality of center frequencies of the ITU frequency standard.

DETAILED DESCRIPTION OF THE INVENTION

Figure 1:
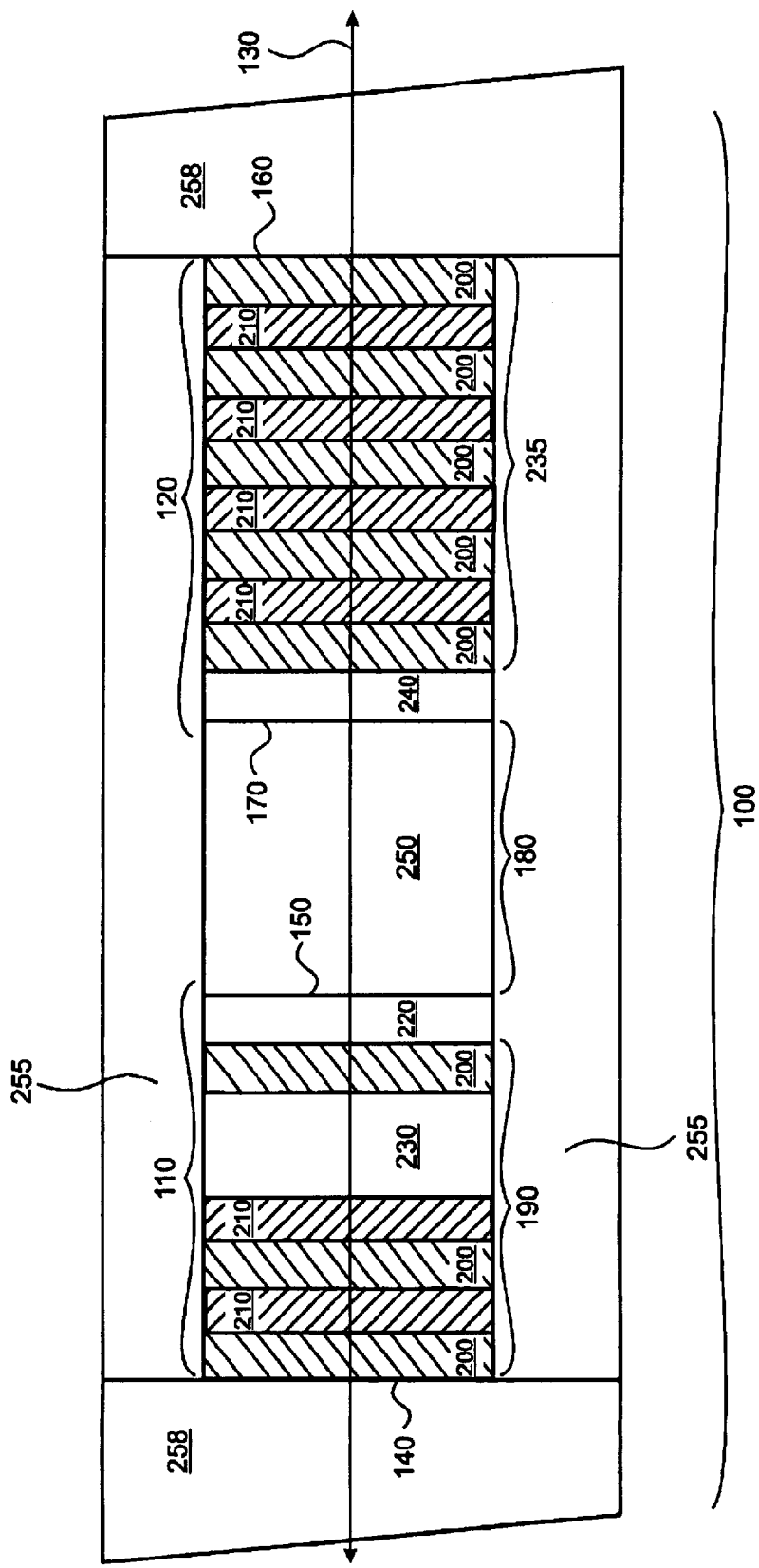
FIG. 1 is a schematic drawing of a FP etalon filter of the present invention having an air gap resonance cavity.

Referring to the drawings, like numerals indicate like elements and the same number appearing in more than one drawing refers to the same element. In addition, hereinafter, the following definitions apply:

"Thin dielectric layer" refers to a thin film comprising a coating of atoms, molecules or ions or mixtures thereof. Dielectric layers useable in the present invention may comprise a single-layer or a plurality of thin dielectric layers. Thin dielectric layers useable in the present invention may have either a homogeneous composition or a heterogeneous composition and may comprise a single phase or a plurality of phases. In a preferred embodiment, reference to dielectric layers in the present invention includes but is not limited to metal oxide thin films. Metal oxides useable in the present invention include but are not limited to silica, $Ta_2O_5$, $SiO_2$, $HfO_2$, $TiO_2$, $MgF_2$, $CaF_2$, $Nb_2O_5$, glass or mixtures of these metal oxides. Dielectric layers of the present invention may also be composed of metal thin films such as Si layers. Dielectric layers of the present invention may be any size, shape, thickness or optical thickness. Thickness may be defined absolutely or relative to the center resonance frequency of either reflector. For example, dielectric layers are commonly referred to as ¼ and ½ layers indicating an optical thickness approximately equal to the indicated fraction of the wavelength of light corresponding to the center resonance frequency of the reflectors comprising the filter. In a preferred embodiment, ¼ and ½ wave layers include but are not limited to thin dielectric layers having a optical thickness within 10% of ¼ or ½ of the wavelength of light corresponding to the center resonance frequency of the reflector. In a more preferred embodiment, ¼ and ½ wave layers include but are not limited to thin dielectric layers having a optical thickness within 5% of ¼ or ½ of the wavelength of light corresponding to the center resonance frequency of the reflector. In addition, dielectric layers of the present invention include layers that are not ¼ or ½ wave layers. Embodiments having dielectric layers that are not ¼ or ½ layers are useful for generating reflectors having any arbitrary reflectivity. For example, dielectric layers of the present invention may have optical thicknesses that are less than or greater than ¼ wave layers. Preferred absolute thickness ranges from 5 nm–5000 nm. More preferred absolute thickness range from 25 nm to 1500 nm.

"Resonance frequency" refers to the maximum frequency of a transmission band of an optical interference filter. For example, the resonance frequency of a Fabry—Perot filter with identical reflectors is given by the expression:

$$v_m = \frac{c}{2nL + \frac{c}{2\pi}(\alpha_1 + \alpha_2)}\left(m - \frac{\Phi_1(v_c) - \alpha_1 v_c}{2\pi} - \frac{\Phi_2(v_c) - \alpha_2 v_c}{2\pi}\right)$$

where $v$ is the resonance frequency, m is the order, $\Phi_1$ is the reflection phase of the first reflector, and $\Phi_2$ is the reflection phase of the second reflector. $v_c$ is the center resonance frequency of each reflector, which may be selected from a distribution of etalon resonance frequencies positioned about the reflectance maximum of either reflector. Resonance frequency is related to the transmission wavelength, which is the wavelength of maximum transmission, by the expression:

$$\lambda = \frac{c}{v}$$

where $v$ is frequency, $\lambda$ is wavelength and c is the speed of light in vacuum. Fabry Perot etalon filters of the present invention have transmission spectra characterized by multiple transmission bands, resonance frequencies and transmission wavelengths. Optical interference filters of the present invention have a resonance frequency that is selectable, substantially independent of the free spectral range. In a preferred embodiment, resonance frequency is substantially independent from the free spectral range such that a 1% change in free spectral range due to the presence of one or more absentee layers results in less than a 0.01% change in resonance frequency. In a more preferred embodiment, resonance frequency is substantially independent from the free spectral range such that a 0.05% change in free spectral range due to the presence of one or more absentee layers results in less than a 0.00001% change in resonance frequency.

"Reflectors" refer generally to devices, device components and materials exhibiting reflectivity. Reflectors of the present invention include partially reflective reflectors and reflectors that reflect substantially all incident light.

The reflectance of reflectors useable in the present invention range from about 5% to about 100%. Preferred reflectors of the present invention comprise single-layer or multilayer coatings with alternating high and low indices of refraction layers. In a more preferred embodiment, the reflector of the present invention comprises thin dielectric film sequences of alternating high and low indices of refraction. The terms "high" and "low" indices of refraction are defined relative to one another. Accordingly, a "high" index of refraction is one larger than a "low" index of refraction and a "low" index of refraction is one smaller than a "high" index of refraction.

"Absentee layer" refers to a thin dielectric layer that exhibits substantially no reflectance at a selected wavelength but does affect the reflectance phase dispersion of a sequence of thin dielectric layers. In a preferred embodiment, an absentee layer has a reflectance of less than 5%. In a more preferred embodiment, an absentee layer has a reflectance of less than 1%. Absentee layers of the present invention increase the reflectance phase dispersion associated with a sequence of thin dielectric layers. Preferred increases in cumulative reflectance phase dispersion attributable to the presence of one or more absentee layers range from about $1.0\times10^{-6}$ rad/GHz to about $1.0\times10^{-3}$ rad/GHz. More preferred increases in cumulative reflectance phase dispersion attributable to the presence of one or more absentee layers range from about $1.0\times10^{-6}$ rad/GHz to about $5.0\times10^{-5}$ rad/GHz. Absentee layer optical thickness may be defined absolutely or relative to the wavelength of light corresponding to the center resonance frequency of either reflector. For example, absentee layer layers may have an optical thickness of about ½ of the wavelength of light corresponding to the center resonance frequency of the reflector. In a preferred embodiment, absentee layers include thin dielectric layers having an optical thickness within 10% of ½ of the wavelength of light corresponding to the center resonance frequency of the reflector. In a more preferred embodiment, absentee layers have an optical thickness within 5% of ½ of the wavelength of light corresponding to the center resonance frequency of the reflector. Preferred absolute thickness ranges from 5 nm–5000 nm. More preferred absolute thickness range from 50 nm to 1500 nm. Absentee layers of the present invention may have the same composition as either high refractive index layers or low refractive index layers. Alternatively, absentee layers may have a composition different than that of the high refractive index layers or low refractive index layers. Absentee layers of the present invention include but are not limited to dielectric layers composed of silica, $Ta_2O_5$, $SiO_2$, $HfO_2$, $TiO_2$, $MgF_2$, $CaF_2$, $Nb_2O_5$, glass, and Si.

"Reflectance phase dispersion" is an optical property that characterizes the variation of the reflection phase shift at a reflector surface with the frequency of incident radiation. In a preferred embodiment, the reflectors of the present invention exhibit reflectance phase dispersion that may be approximated as a linear relationship between the reflection phase shift at the virtual mirror surface and frequency. This approximation may be expressed in terms of the reflectance phase dispersion by the following equation:

$$\Phi(v) = \Phi(v_c) + \alpha(v - v_c)$$

where $\Phi(v)$ is the reflection phase shift at the mirror surface, $v_c$ is the center resonance frequency of the reflector and $\alpha$ is the reflectance phase dispersion. In a preferred embodiment, the reflection phase shift approximately linear with respect to frequency over the desired frequency range. In preferred embodiments relating to the telecommunications field, the reflection phase shift is approximately linear with respect to frequency over the frequency range of about 189 THz to about 196 THz. The cumulative reflectance phase dispersion of an etalon optical filter of the present invention reflects the sum of the reflectance phase dispersion associated with each reflector:

$$\alpha_{cumulative} = \alpha_1 + \alpha_2$$

where $\alpha_1$ is the reflectance phase dispersion of the first reflector and $\alpha_2$ is the reflectance phase shift of the second reflector. In a preferred etalon filter of the present invention, the cumulative reflectance phase dispersion is selected by adjusting the position and number of absentee layers in a sequence of dielectric layers comprising at least one reflector.

"Free spectral range" is an optical property that characterizes the spacing of transmission bands of an etalon filter. Specifically, free spectral range is a quantitative measure of the frequency spacing between successive transmission or phase maxima. Etalon filters of the present invention have a free spectral range that is selectable, substantially independent of the resonance frequency. Etalon filters of the present invention may have a substantially periodic free spectral range, wherein the transmission bands are approximately equally spaced from each other with respect to frequency. In a preferred embodiment, the frequencies of substantially periodic transmission bands do not deviate by more than 1% of the average spacing between transmission bands. In a more preferred embodiment, the position of substantially periodic transmission bands do not deviate by more than 0.1% of the average spacing between transmission bands. Alternatively, etalon filters of the present invention may have an aperiodic spacing, wherein the transmission bands are not equally spaced from each other with respect to frequency.

"Bandwidth" refers to the property of optical filters related to the distribution of wavelengths of light transmitted by a given transmission band. Specifically, bandwidth is defined as the full width at half maximum of a given transmission band. In a preferred embodiment, the bandwidth of the optical interference filters of the present invention is selected from the range of about 100 MHz to about 100 GHz.

"Frequency standard" refers to one or more selected frequencies that comprise an optical system. For example, a frequency standard may comprise the transmission channels of a telecommunication system, such as the ITU frequency grid. Transmission channels may comprise a single frequency or a range of frequencies. Frequency standard may also refer to the emission lines of a given optical source, such as the modes of a laser or photoluminescent emitter.

"Transmission band" refers to a distribution of wavelengths, centered about a maximum transmission wavelength, which is transmitted by an interference filter. Interference filters of the present invention are characterized by one or more transmission bands.

"Frequency matching" refers to a method of aligning one or more transmission bands of an interference filter to overlap one or more frequencies of a frequency standard. Interference filters of the present invention may be frequency matched to a selected frequency standard by selection of the number, position and composition of absentee layers in a sequence of dielectric layers comprising at least one reflector. FP etalon filters of the present invention are capable of being frequency matched to any frequency standard, preferably to the ITU frequency grid. In a preferred embodiment, frequency matching refers to aligning the center frequencies of the transmission channels of a selected frequency standard to a highly sloped region of the transmission band, such as the region around approximately the half maximum of each etalon transmission band. Such preferred alignment is particularly useful for wavelength monitoring and tuning applications because the slope of the transmission band at the half maximum is large, and, thus, deviations from the center frequency of the transmission channel result in a large change in percentage transmittance.

"Resonance cavity" refers to the space located between parallel reflectors of an optical interference filter. In a preferred embodiment, the resonance cavity of the present invention comprises a dielectric cavity layer positioned directly adjacent to the internal side of each reflector. In a more preferred embodiment, the resonance cavity comprises a metal oxide cavity layer including but not limited to fused silica, $Ta_2O_5$, $SiO_2$, $HfO_2$, $TiO_2$, $MgF_2$, $CaF_2$, $Nb_2O_5$, and glass. Alternatively, the resonance cavity of the present invention may be an air gap cavity. In this embodiment, the air gap may be substantially evacuated or be filled with a selected pressure of one or more noncorrosive gas. Further, the air gap cavity may have a fixed, selected refractive index or a refractive index that is tunable. Resonance cavities of the present invention may have a fixed, selected optical path length, for a given angle of incidence. Alternatively, resonance cavities of the present invention may have tunable optical path length. Preferred optical path lengths are selected from the range of about 100 nm to about 10 mm. More preferred optical path lengths are selected from the range of about 0.5 mm to about 5 mm.

"Ultra flat" refers to an extent of surface irregularity of a given optical surface with a deviation from average surface position approximately on the order of the light impinging on the surface. The spatial frequency of an ultra flat optical surface is smaller than the frequency of light impinging on the surface. In a preferred embodiment, ultra flat surfaces of the present invention have deviations from average surface position of less than 50 nm.

"Ultra smooth" refers to an extent of surface irregularity of a given optical surface wherein the lateral distance between prominent surface features is substantially smaller than the wavelength of light impinging on the surface. The spatial frequency of an ultra smooth optical surface is greater than the frequency of light impinging on the surface. In a preferred embodiment, ultra smooth surfaces of the present invention have deviations from average surface position of less than 1 angstrom.

"Parallel" refers to a geometry in which two surfaces are equidistant from each other at all points and have the same direction or curvature. Substantially parallel refers to a geometry in which all deviations from absolute parallelism are less than 0.05 degree. In a preferred embodiment, the reflectors of the present invention are located in substantially parallel planes with respect to one another.

"Optical thickness" refers to the product of the thickness and the refractive index of a layer and may be express by the equation:

$$\text{optical thickness} = (L)(n)$$

where L is the physical thickness and n is the refractive index.

"Center resonance frequency of a reflector" refers to a resonance frequency of an etalon optical filter that is chosen from a distribution of resonance frequencies that are positioned about the reflectance maximum of the first reflector, the second reflector or both. In a preferred embodiment of the present invention, the center resonance frequency is within 2% of the reflectance maximum of the first reflector, second reflector or both. In a more preferred embodiment of the present invention, the center resonance frequency is within 1% of the reflectance maximum of the first reflector, second reflector or both.

This invention provides optical interference filters and methods of using optical interference filters. In particular, the present invention provides optical interference filters with substantially independent, selectable resonance frequency and free spectral range.

FIG. 1 illustrates an exemplary embodiment of the optical interference filter of the present invention having a resonance cavity comprising an air gap cavity. The illustrated interference filter (100) comprises a first reflector (110) and second reflector (120) in optical communication with each other and positioned to intersect propagation axis (130). First reflector (110) has an external end (140) and an internal end (150) and second reflector (120) has an external end (160) and an internal end (170). The internal end of second reflector (120) is positioned a selected optical path length (180) from the internal end (150) of first reflector (110) and both reflectors are located in substantially parallel planes with respect to each other.

First reflector (110) comprises a first sequence of thin dielectric layers (190) on substrate (220). First sequence of thin dielectric layers (190) comprises alternating high refractive index layers (200) and low refractive index layers (210). In addition, first reflector (190) comprises absentee layer (230) positioned within first sequence of thin dielectric layers (190). Optionally, first reflector (190) may comprise a plurality of absentee layers positioned within first sequence of thin dielectric layers (190). Second reflector (120) comprises a second sequence of thin dielectric layers (235) on substrate (240). Second sequence of thin dielectric layers (235) comprises alternating high refractive index layers (200) and low refractive index layers (210). Optionally, second reflector (120) may comprise at least one absentee layer positioned within the second sequence of thin dielectric layers (235). Resonance cavity (250) having selected optical path (180) for a given angle of incidence is formed between first reflector (110) and second reflector (120) and is positioned along propagation axis (130). Specifically, resonance cavity (250) is an air gap cavity and occupies the space between substrate (220) and substrate (240). First reflector (110), second reflector (120) and resonance cavity (250) are oriented in a manner such that they are all in optical communication with each other.

In a preferred embodiment, resonance cavity (250) has a substantially constant optical path length for a given angle of incidence. To achieve a highly stable optical path length, first reflector (110) and second reflector (120) may be kinematically mounted in holder or spacer. In the embodiment depicted in FIG. 1, first reflector (110) and second reflector (120) are held in place by spacer (255) and end plates (258). Such methods of kinematically mounting reflectors are well known in the art. Resonance cavity (250) may be substantially a vacuum or may be composed of a selected pressure of one or more gases. The composition of gases in resonance cavity (250) determines the refractive index and the thermal expansion coefficient of the cavity, which in turn influences the transmission characteristics of the filter. Any gas or combination of noncorrosive gases may be used in the resonance cavity of the present invention including but not limited to $O_2$, $N_2$, $CO_2$, $SF_6$, $NF_3$, $CF_4$ and $C_2F_6$.

Figure 2:
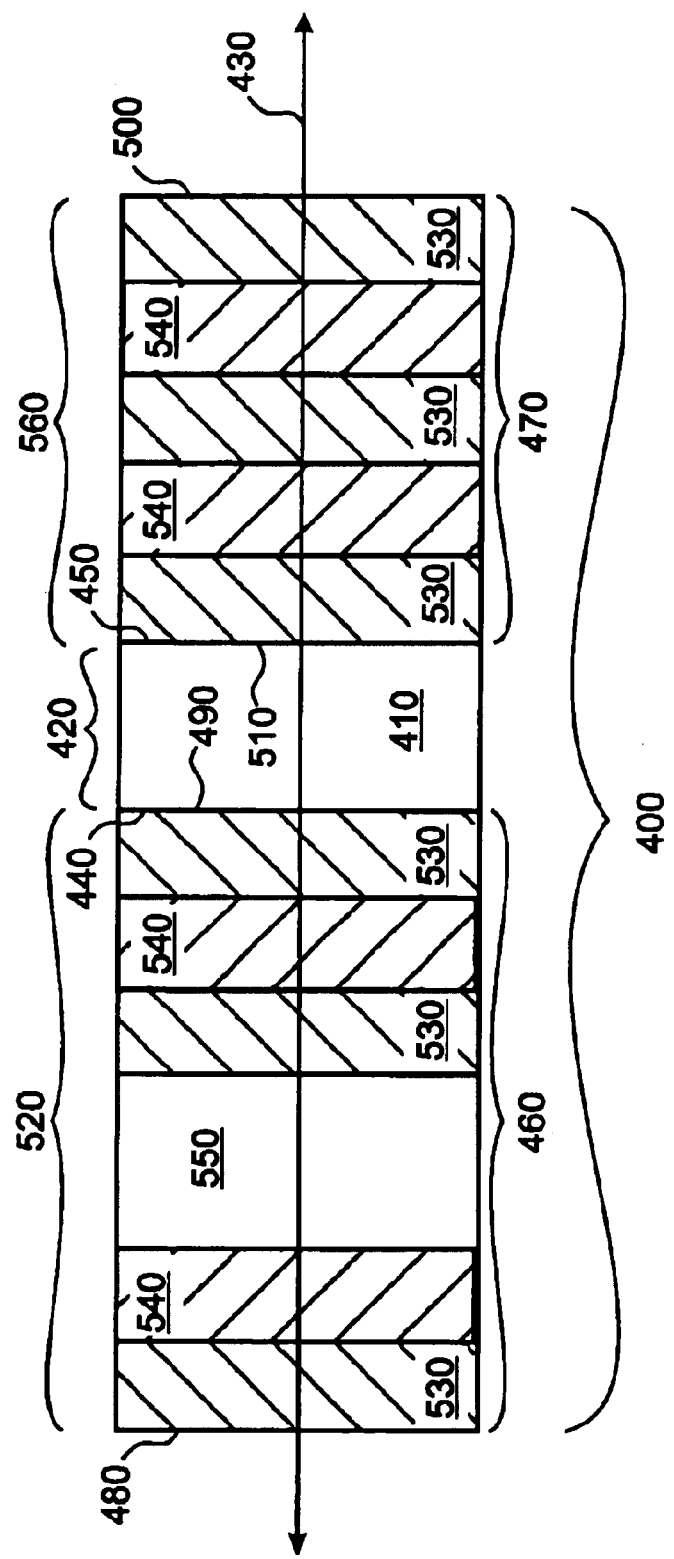
FIG. 2 is a schematic drawing of a FP etalon filter of the present invention having a dielectric layer resonance cavity.

FIG. 2 illustrates another exemplary embodiment of the optical interference filter of the present invention having a resonance cavity comprising a dielectric cavity layer. The illustrated optical interference filter (400) comprises a dielectric cavity layer (410) of selected optical path length (420) positioned along propagation axis (430). Dielectric cavity has a first end (440) and a second end (450) that intersects propagation axis (430). First reflector (460) has an external end (480) and an internal end (490) and is operationally coupled to first end (440) of dielectric cavity layer (410). Second reflector (470) has an external end (500) and an internal end (510) and is operationally coupled to second end (450) of dielectric cavity layer (410). First reflector (460) and second reflector (470) are in optical communication with dielectrical cavity layer (410) and are located in substantially parallel planes with respect to each other.

First reflector (460) comprises a first sequence of thin dielectric layers (520) comprising alternating high refractive index layers (530) and low refractive index layers (540). In addition, first reflector (460) comprises absentee layer (550) positioned within first sequence of thin dielectric layers (520). Optionally, first reflector (460) may comprise a plurality of absentee layers positioned within first sequence of thin dielectric layers (520). Second reflector (470) comprises a second sequence of thin dielectric layers (560) comprising alternating high refractive index layers (530) and low refractive index layers (540). Optionally, second reflector (470) may comprise one or more an absentee layer positioned within the second sequence of thin dielectric layers (560).

Dielectric cavity layer (410) may be any dielectric material including but not limited to glass, fused silica, quartz, sapphire, germanium, zinc selenide, $Ta_2O_5$, $SiO_2$, $HfO_2$, $TiO_2$, $MgF_2$, $CaF_2$ and $Nb_2O_5$. Use of low expansion materials is preferred to achieve a substantially constant and stable optical path length as a function of temperature. In a preferred embodiment, the dielectric cavity layer has ultra smooth and ultra flat first end (440) and a second end (450).

First and second sequences of thin dielectric films may comprise any number of high and low refractive index pairs and any number of absentee layers. In a preferred embodiment, first and second sequences each comprise less than 10 high and low refractive index pairs. In an exemplary embodiment, high refractive index layers and low refractive index layers are metal oxide layers that are deposited on to a fused silica substrate. Preferably, high refractive index layers and low refractive index layers have an optical thickness equal to about ¼ the wavelength of light corresponding to center resonance frequency of either reflector and are made of $Ta_2O_5$ (refractive index of 2.025) and $SiO_2$ (refractive index of 1.445), respectively. In a preferred embodiment, fused silica substrate has a thickness equal to about 2 mm. In an exemplary embodiment, absentee layer is a metal oxide layer and has an optical thickness equal to about ½ the wavelength of light corresponding to the center resonance frequency of the reflector. In a preferred embodiment, dielectric layers and substrates of the present invention have ultra smooth and ultra flat surfaces.

In order to produce thin film coatings with any arbitrary reflectivity, it is commonly necessary to use high refractive index layers and low refractive index layers that do not consist of quarter wave layers. Such uses of high refractive index layers and low refractive index layers that do not consist of quarter wave layers are well known in the art of thin film optical coatings. Specifically, the layer thicknesses of high refractive index layers and low refractive index layers are adjusted to achieve the desired reflectivity and the cumulative phase dispersion is selected by addition of absentee layers. Often, this adjustment results in high refractive index layers and low refractive index layers that deviate from ¼ of the wavelength of light corresponding to center resonance frequency of either reflector. Further, it is commonly necessary to further adjust the layer thicknesses of high refractive index layers and low refractive index layers to maintain the desired reflectivity with the addition of absentee layers.

Absentee layer may be in any position within first or second sequence of thin dielectric layers. Positioning absentee layer close to the external end of the first reflector increases the reflectance phase dispersion experienced substantially more than positioning absentee layer close to internal end of the first reflector. Positioning absentee layer close to internal end of the second reflector increases the reflectance phase dispersion experienced substantially more than positioning absentee layer close to external end of the second reflector. Inclusion of a plurality of absentee layers in first sequence of thin dielectric films, second sequence of dielectric films or both further increases the cumulative reflectance phase dispersion. For example, current etalon designs are not capable of providing an optical interference filter with a free spectral range of 50.00 GHz and a resonance frequency at 194000 GHz. Prior art etalons having a resonance cavity optical path length of 2.997 mm are capable of achieving a free spectral range of 50.000 GHz. This cavity length, however, results in a resonance frequency of 194008.2 GHz. This deviation from the desired resonance frequency is substantial and results from the relatively small reflectance phase dispersion of prior art etalon reflectors. Such reflectors typically have cumulative reflectance phase dispersions of about $2 \times 10^{-5}$ rad/GHz. Addition of absentee layers to the dielectric thin films comprising the etalon reflectors, however, can substantially increase the reflectance phase dispersion and compensate for the deviation from the desired resonance frequency. For example, increasing the reflectance phase dispersion of each reflector to $3.24 \times 10^{-5}$ rad/GHz, results in an etalon having a free spectral range of 50.000 GHz and a resonance frequency of 194000.0 GHz.

The number of absentee layers in first sequence, second sequence or both, the composition of absentee layers and the position of the absentee layers of a given optical thickness, composition and position in the first sequence, second sequence or both is selected to provide a selected cumulative reflectance phase dispersion. Computation of the increase in reflectance phase dispersion caused by the inclusion of one or more absentee layers may be performed by commercially available software, preferably Mcleod by Thin Film Center. Alternatively, determination of an absentee layer configuration necessary to achieve a desired free spectral range and resonance frequency may be determined empirically.

Sequences of dielectric layers and dielectric cavity layers useable in the present invention may be made by deposition and/or bonding techniques well known in the art of optical engineering including but not limited to vapor deposition, chemical deposition, sputtering methods, optical contact techniques and the use of optical cement. Sequences of dielectric layers may be flat or slightly wedged shaped. In a preferred embodiment, each dielectric layer has an ultra smooth surface and a substantially uniform composition. In another preferred embodiment, the sequence of dielectric layer includes an antireflection layer, protective layer or both on its exterior end.

During operation as an optical filter, incident light having a selected angle of incidence is directed through the optical interference filter, wherein it interacts with the first reflector. A portion of the incident beam is reflected and the transmitted portion propagates through resonance cavity and interacts with the second reflector. The light undergoes partial reflection upon every interaction with first and second reflectors and, thus, multiple beams are formed. Specifically, light undergoes partial reflection upon interaction with each high refractive index–low refractive index pair and also experiences a selected reflectance phase dispersion upon interaction with absentee layers present in the sequences of thin dielectric films. The multiple reflections cause interference between transmitted and reflected beams. The interference observed is either constructive or destructive depending on the wavelength of the incident light and the optical path length. Only light of a selected frequency corresponding to the transmission bands is observed to exit the optical interference filter. In a preferred embodiment, the composition, refractive index and number of absentee layers and the position of absentee layers in first sequence, second sequence or both is selected to achieve the desired transmission wavelengths, resonance frequencies and free spectral range of the interference filter.

In an exemplary embodiment, the FP etalon of the present invention comprises a GT etalon filter. In this embodiment, the first reflector comprises a first partially reflective reflector and the second reflector comprises a highly reflective reflector. A resonance cavity having a fixed optical path length is formed between first and second reflectors, which may comprise an air gap cavity or dielectric layer cavity. In a preferred embodiment, first reflector is composed of a first sequence of thin dielectric layers having a net reflectance selected from the range of about 1% to about 70% and the second reflector is composed of a second sequence of thin dielectric layers having a net reflectance selected from the range of about 90% to about 100%. One or more absentee layers are present within the first dielelectric layer sequence, second dielectric layer sequence or both to provide a selected increase in the cumulative reflectance phase dispersion of the GT etalon. Specifically, the position, number, refractive index, optical thickness and composition of the absentee layers in the first and/or second sequence of dielectric layers is selected to provide the desired increase in cumulative reflectance phase dispersion. In a preferred embodiment, the increase in cumulative reflectance phase dispersion associated with the presence of one or more absentee layers is selected to provide a selected cumulative reflectance phase dispersion which establishes the desired free spectral range and resonance frequency of the etalon filter.

The GT etalon filter of the present invention operates by multiple-beam interference of light reflected and transmitted by the first partially reflected reflector and second highly reflective reflector. Specifically, an incident beam is partially reflected by the first reflector. The transmitted portion of the beam propagates through the resonance cavity and is substantially all reflected by the second reflector. Thus, the reflected portion is directed back through the resonance cavity and interacts with the first reflector. The multiple beams formed upon each interaction with the first partially reflective reflector undergo constructive and/or destructive interference such that only desired frequencies of light exit the GT etalon. The GT etalon filter of the present invention is useful for wavelength division multiplexing applications. For example, the GT etalon of the present invention may comprise a device component integrated into an interleaver or deinterleaver device. Further, the GT etalon filter of the present invention is useful for compensating chromatic dispersion and may comprise a device component integrated into a dispersion compensator.

The optical interference filters of the present invention may be used to filter any light source including but not limited to (1) continuous sources such as solid-state lasers, semiconductor lasers, gas phase lasers, helium—neon lasers, atomic and molecular discharge lamps and (2) pulsed sources such as pulsed gas phase lasers, pulsed or modulated solid-state semiconductor lasers and pulsed lamps. The optical path length of the resonance cavities of the present invention may be selectively adjusted by variation of the angle of incidence of the incident beam. Accordingly, the resonance frequency of the interference filters of the present invention may be adjusted by selection of the angle of incidence of the incident light beam by techniques well known in the art of etalon optical filtering.

Figure 3:
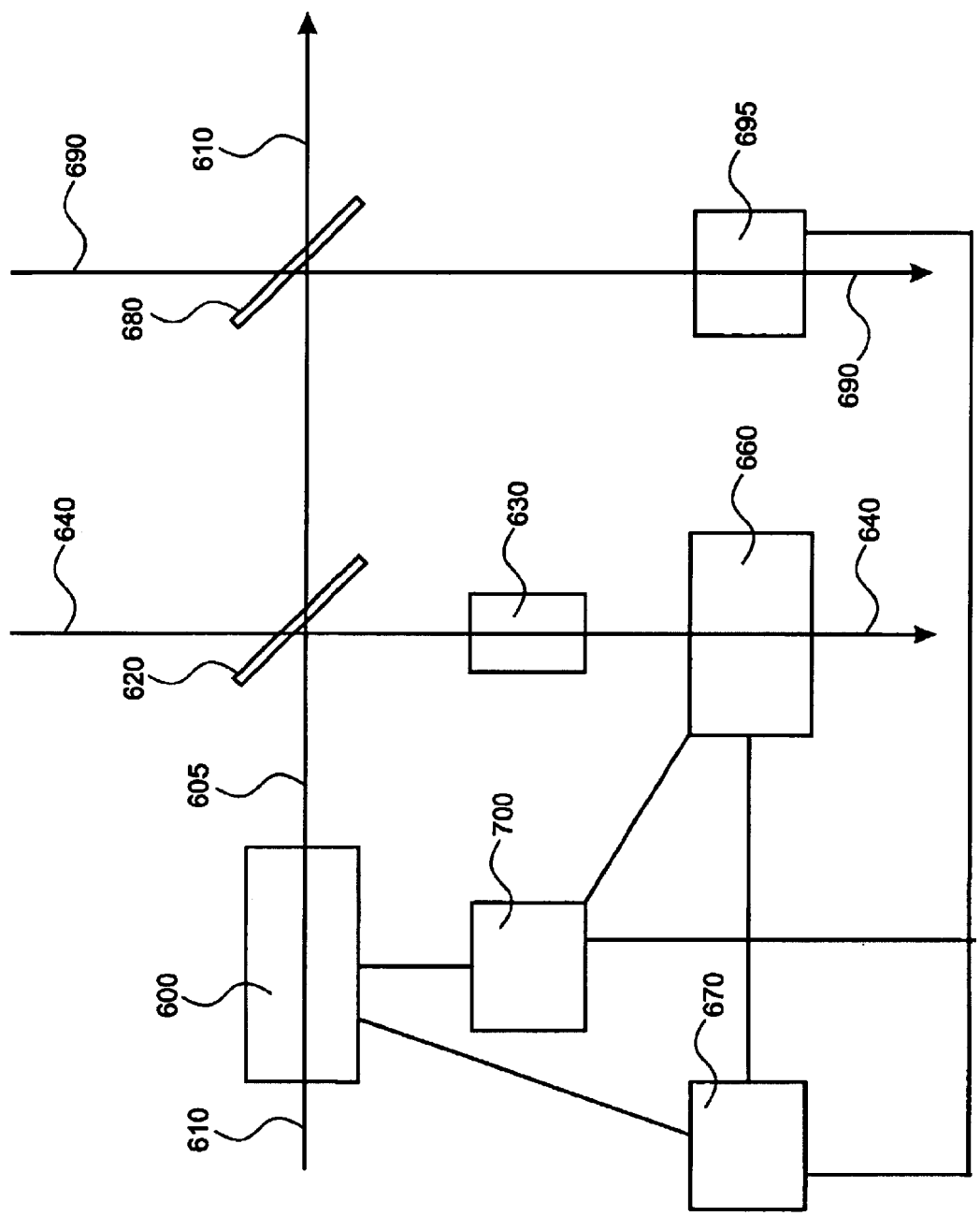
FIG. 3 is a schematic drawing of a device employing the optical interference filter of the present invention for monitoring the frequency of an optical source.

FIG. 3 illustrates an exemplary embodiment of an optical arrangement for monitoring the frequency and intensity of an optical source. The illustrated optical arrangement comprises a light source (600) oriented such that the light beam (605) generated propagates along light generation axis (610). Light beam (605) is directed on to first beam splitter (620), which is in optical communication with light source (600) and positioned a selected distance from light source (600) such that it intersects light generation axis (610). A portion of light beam (605) is reflected by first beam splitter (620) and directed along a first light-monitoring axis (640). The reflected portion of light beam (605) is passed through optical interference filter (630), which is in optical communication with beam splitter (620) and positioned along first light monitoring axis (640). Optical interference filter (630) is designed and arranged, as discussed above, to only permit passage of incident light corresponding to selected resonance frequencies separated by a selected free spectra range. Light having a frequency corresponding to the transmission bands exits optical interference filter (630) and is detected by detector (660), which is in optical communication with first beam splitter (620) and is positioned along first light monitoring axis (640). All other frequencies of light do not pass though optical interference filter (630), and, hence, are not detected. By techniques well known in the art, the signal from detector (660) is measured and stored by computer (700), which is operationally connected to detector (660). Alternatively, the signal from detector (660) may be sent directly to feedback circuit (670), which is operationally connected to detector (660). Accordingly, this embodiment allows for monitoring the intensity of light from light source (600) having a wavelength within the distribution of wavelengths comprising the transmission bands of optical interference filter (630).

Optionally, the optical arrangement illustrated in FIG. 3 may comprise a second beam splitter (680) in optical communication with light source (600). In the preferred embodiment depicted in FIG. 3, second beam splitter (680) is positioned to intersect light propagation axis (610). Incident light from light source (600) is directed at second beam splitter (680) and a portion is reflected along a second light beam-monitoring axis (690) and is detected by a second detector (695), which is in optical communication with beam splitter (680) and positioned along second light monitoring axis (690). By techniques well known in the art, the signal from detector (695) is measured and stored by computer (700), which is operationally connected to detector (695). Alternatively, the signal from detector (695) may be sent directly to feedback circuit (670). This embodiment of the present invention allows for simultaneous monitoring of the total intensity of light from light source (600) and the intensity of light from light source (600) having a wavelength within the distribution of wavelengths comprising the transmission bands of optical interference filter (630).

Optionally, the optical arrangement illustrated in FIG. 3 may comprise feedback circuit (670) operationally connected to light source (600), detector (660) and detector (695). Feedback circuit (670) may also be operationally connected to computer (700). In a preferred embodiment, feedback circuit (670) maintains a constant ratio of the signal from detector (660) and the signal from detector (695). Comparison of the magnitude of the signal from detector (660) and the signal from detector (695) provides a means of evaluating the proportion of the output of light source (600) corresponding to the distribution of wavelengths comprising the transmission bands of the filter. In a more preferred embodiment, feedback circuit (670) is a differentiating circuit that differentiates the signal from detector (660) and the signal from detector (695) and creates an error signal to correct the wavelength to the etalon and reference channel crossing point. In an even more preferred embodiment, the crossing point is located at a highly sloped region of the etalon transmission band, thus, providing a very sensitive means of monitoring and frequency tuning the output of light source (600). Feedback element (670) may also be configured to optimize the intensity of light from light source (600) having a wavelength within the distribution of wavelengths comprising the transmission bands of optical interference filter (630). It should be understood to one of skill in the art that feedback circuits are but one means for tuning the frequency and intensity of optical source (600) and that the present invention also includes other feedback means well known in the art.

EXAMPLE 1

FP Etalon Filter Frequency Matched to the Transmission Channels of the ITU Frequency Standard The ability of the optical interference filter of the present invention to be frequency matched to the transmission channels of the ITU transmission grid was evaluated and compared to etalon designs in the prior art. The standard channel definition of the ITU frequency standard provides for a 45 channel system over a wavelength range of 1533 nm to 1565 nm with a uniform channel spacing of 100 GHz (approximately 0.8 nm). Therefore, it is a goal of the present invention to design an optical interference filter with a 100 GHz free spectral range and with resonance frequency positions matched to the ITU frequency standard. Further, the spacing of resonance peaks must be matched to the desired reference spacing to a very high degree of accuracy, commonly 1–5 ppm, to ensure efficient and accurate signaling. Accordingly, an optimal etalon must have a free spectral Range of 100 GHz, corresponding to a mirror spacing of approximately 1.5 mm. Further, a transmission resonance peak is desired to have a frequency of 193994 GHz, so that the negative slope edge of the resonance crosses the ITU Grid point frequency of 194000 GHz at −3 dB (50%) transmission with a slope of about 8.3%/GHz. The etalon was designed to have nominally identical partial reflectors with a reflectance of 69%.

The prior art etalon designed to frequency match the ITU transmission channels as close as possible comprises reflectors composed of a quarter wave layers of alternating high and low refractive index as shown in Table 1.

TABLE 1

Prior Art Reflector Design of Etalon Frequency Match to the ITU Frequency Grid

| Layer # | Material | Refractive Index | Optical Thickness |
| --- | --- | --- | --- |
| Medium | Air | 1.000 | |
| 1 | Ta2O5 | 2.025 | 0.25 |

TABLE 1-continued

Prior Art Reflector Design of Etalon Frequency Match to the ITU Frequency Grid

| Layer # | Material | Refractive Index | Optical Thickness |
|---|---|---|---|
| 2 | SiO2 | 1.445 | 0.25 |
| 3 | Ta2O5 | 2.025 | 0.25 |
| 4 | SiO2 | 1.445 | 0.25 |
| 5 | Ta2O5 | 2.025 | 0.25 |
| Substrate | Fused Silica | 1.444 | |

The prior art reflector design illustrated in Table 1 has a value of the reflectance phase dispersion of approximately $2.02 \times 10^{-5}$ radians/GHz. When the prior art etalon is angle tuned to have a resonance frequency at 193994 GHz, its free spectral range is 99.984 GHz. This corresponds to a deviation of 0.014 GHz compared to the nominally desired 100.000 GHz. Across 50 channels this error accumulates to 0.7 GHz, a significant deviation that substantially impedes wavelength division multiplexing applications.

An etalon of the present invention adds a $SiO_2$ absentee layer of 0.5 waves optical thickness between layers 2 and 3 in the first and second sequence of thin dielectric layers. This reflector composition is shown in Table 2.

TABLE 2

Mirror Design for Etalon Filter Frequency Match to the ITU Frequency Grid

| Layer # | Material | Refractive Index | Optical Thickness |
|---|---|---|---|
| Medium | Air | 1.000 | |
| 1 | Ta2O5 | 2.025 | 0.25 |
| 2 | SiO2 | 1.445 | 0.25 |
| 2a | SiO2 | 1.445 | 0.50 |
| 3 | Ta2O5 | 2.025 | 0.25 |
| 4 | SiO2 | 1.445 | 0.25 |
| 5 | Ta2O5 | 2.025 | 0.25 |
| Substrate | Fused Silica | 1.444 | |

The addition of the absentee layers in first and second reflectors does not affect the reflectance significantly. The presence of the absentee layers does, however, substantially increase the reflectance phase dispersion of each reflector to approximately $3.14 \times 10^{-5}$ radians/GHz. When the etalon of the present invention is angle tuned to have a resonance frequency at 193994 GHz, its free spectral range is 100.000 GHz. This matches the desired free spectral range to better than 0.5 MHz. Across 50 channels this error accumulates to at most 0.025 GHz. Accordingly, the etalon design shown Table 2 satisfies the frequency constraints of the ITU frequency standard, within very narrow tolerances.

Figure 4:
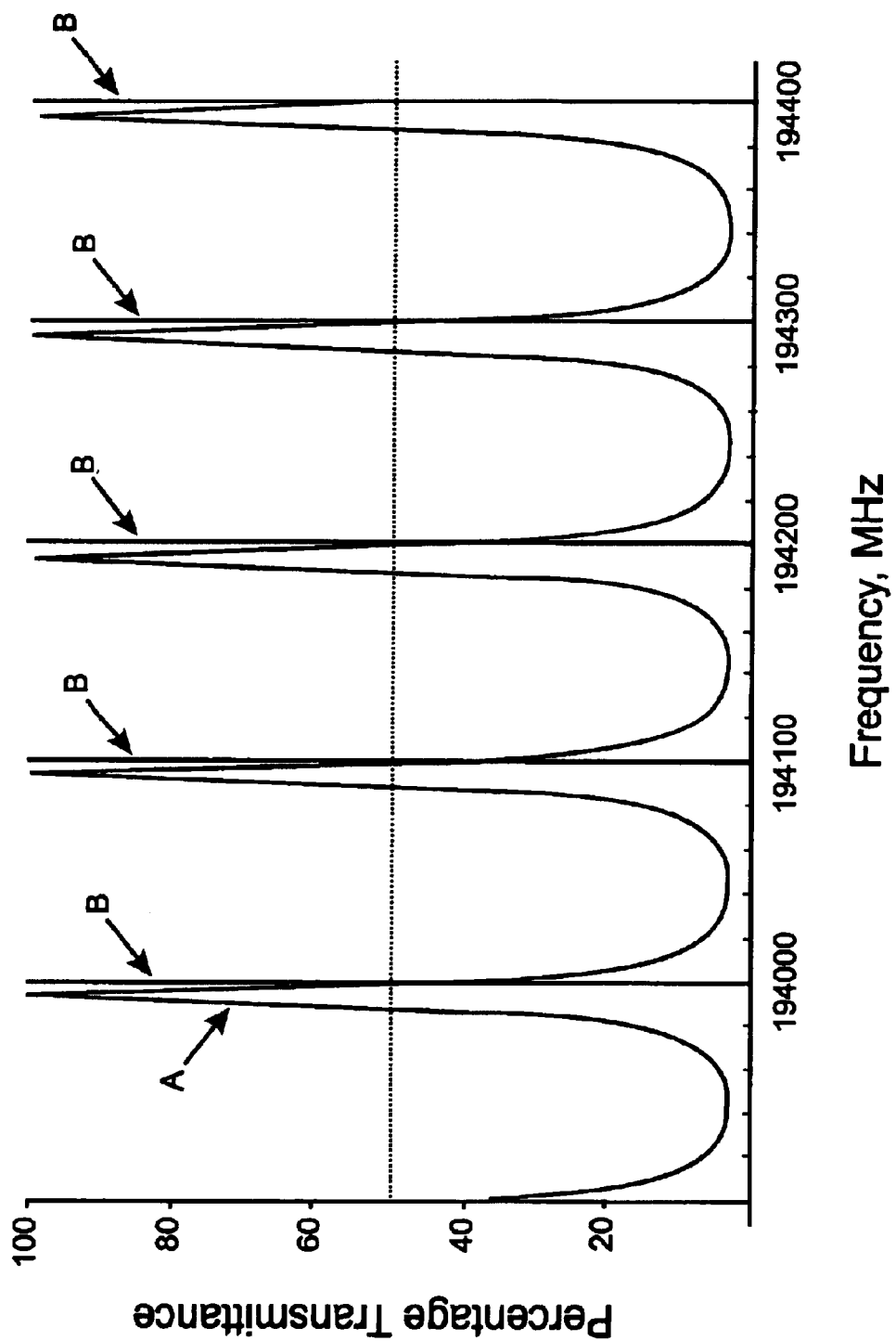
FIG. 4 shows a transmission spectrum of a FP etalon filter of the present invention (A). Also shown are the center frequencies of the transmission channels of the International Telecommunications Union frequency standard (B).

FIG. 4 shows a transmission spectrum of the etalon described in this example (A) with the center frequencies of the ITU transmission channels (B) indicated for comparison. As shown in FIG. 4, the center frequencies of the ITU transmission channels are positioned at approximately the same frequency as the half maximum of the leading edge of each etalon transmission band. This spectral overlap is beneficial because it permits very sensitive frequency monitoring when the etalon is used in wavelength discrimination applications. Each intersection point of the etalon transmission band and center frequency of each ITU transmission channel exhibits a very large slope. This alignment results in a large change in percentage transmittance when the frequency of light propagating through the etalon deviates from the center frequency of a given ITU transmission channel. Accordingly, the etalon reflector design set forth in Table 1 is particularly useful for frequency monitoring and wavelength tuning applications.

Figure 5A:
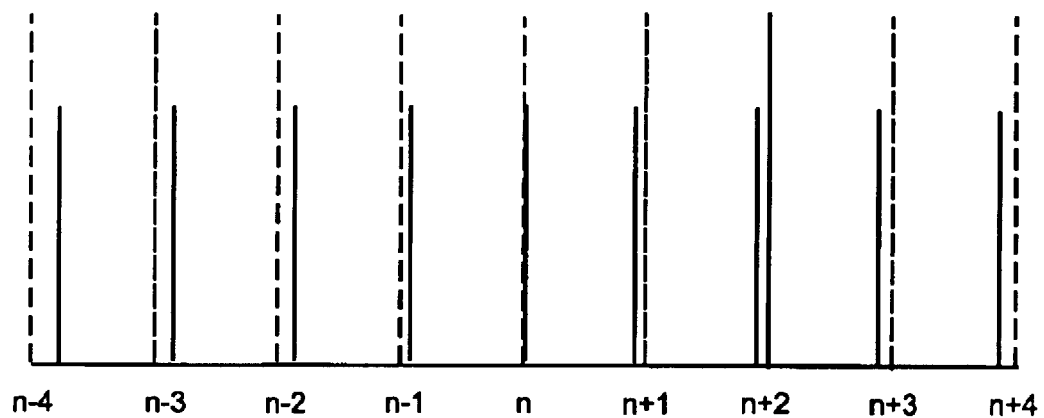
FIG. 5A shows the resonance frequencies of a prior art etalon design having a center resonance frequency of the reflector selected to match the transmission channels of the ITU grid.
Figure 5B:
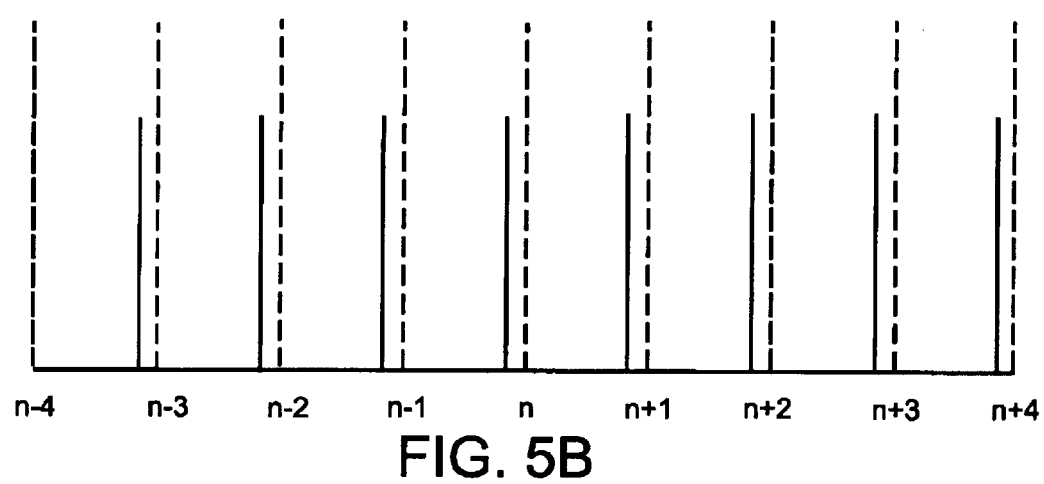
FIG. 5B shows the resonance frequencies of a prior art etalon having a free spectral range selected to match the transmission channels of the ITU grid.
Figure 5C:
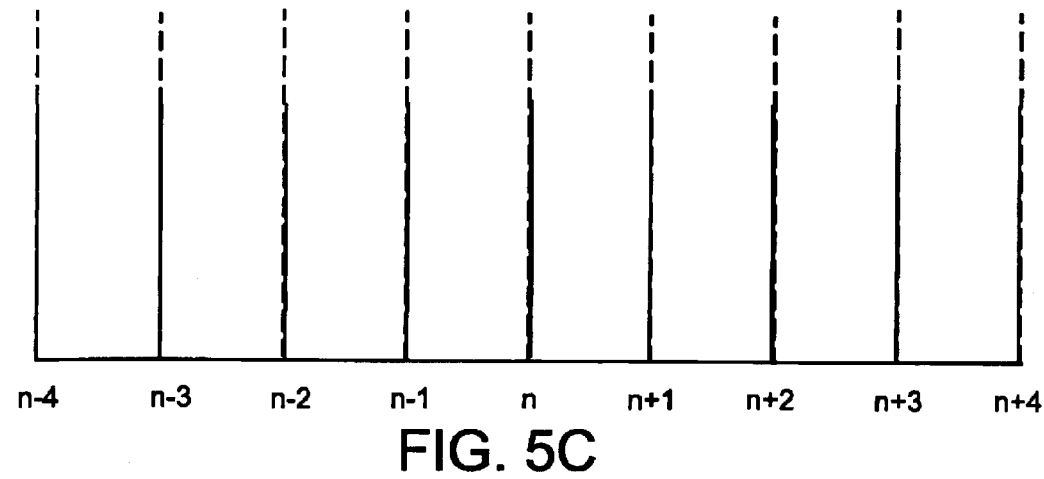
FIG. 5C shows the transmission spectrum of the etalon optical filter of the present invention.

FIGS. 5A, B and C show a comparison of the transmission spectra of the etalon filter of this example with two prior art etalon designs. Etalon resonance frequencies are depicted as solid lines and the center frequencies of the ITU grid are shown as dashed lines. FIG. 5 demonstrates that etalons of the present invention are capable of precisely frequency matching optical signals to a plurality of center frequencies of the ITU frequency standard. Further, FIG. 5 demonstrates that prior art etalon designs are able to precisely match, at best, only one transmission channel of the ITU frequency grid. FIG. 5A shows the resonance frequencies of a prior art etalon design having a center resonance frequency of the reflector selected to match a selected transmission channel of the ITU grid. As shown in FIG. 5A, at n equal to zero (the center resonance frequency of the reflector) the overlap between etalon resonance frequency and the ITU frequency standard is very good. Substantial deviations between resonance frequency and ITU frequencies are evident, however, for all other orders of the etalon. FIG. 5B shows the resonance frequencies of a prior art etalon having a free spectral range selected to match the transmission channels of the ITU grid. As shown in FIG. 5B, no overlap between etalon resonance frequency and the ITU frequencies is observed. FIG. 5C shows the transmission spectrum of the etalon optical filter of this example. As shown in FIG. 5C, the resonance frequencies of the etalon of the present example substantially overlap the center frequencies of the ITU grid for all the orders shown. Accordingly, the etalon of the present example is very useful for frequency matching applications involving the ITU frequency standard. It should be apparent to persons of ordinary skill in the art that the etalon filters of the present invention may be accurately frequency matched to any frequency substantially periodic standard, not just the transmission channels of the ITU.

EXAMPLE 2

GT Etalon Filter Frequency Matched to the Transmission Channels of the ITU Frequency Standard A GT etalon of the present invention capable of frequency matching to the transmission channels of the ITU frequency grid was evaluated and compared to GT etalon designs in the prior art. Specifically, a GT etalon was designed to have a free spectral range a close as possible to 50 GHz and a resonance frequency as close as possible to a frequency of 194000 GHz. Further, the GT etalon was designed to comprise a partial reflector with a reflectance of approximately 48% at one mirror and a high reflector with a reflectance of 99.95%.

Prior art GT etalon designs with a free spectral as close as possible to 50 GHz and a resonance frequency as close as possible to a frequency of 194000 GHz comprises a partially reflective reflector and highly reflective reflector separated by a resonance cavity with an optical path length of approximately 3.0 mm. Specifically, the partially reflective reflector comprises a first sequence of quarter wave layers of alternating high and low refractive indexes as shown in Table 3 and has a reflectance phase dispersion of approximately $1.37 \times 10^{-5}$ radians/GHz.

TABLE 3

Prior Art Partially Reflective Reflector Design for GT Etalon Frequency Matched to the ITU Frequency Grid

| Layer # | Material | Refractive Index | Optical Thickness |
|---|---|---|---|
| Medium | Air | 1.000 | |
| 1 | Ta2O5 | 2.025 | 0.25 |
| 2 | SiO2 | 1.445 | 0.25 |
| 3 | Ta2O5 | 2.025 | 0.25 |
| Substrate | Fused Silica | 1.444 | |

The highly reflective reflector of the prior art GT etalon design comprises a second sequence of quarter wave layers of alternating high and low refractive indexes as shown in Table 4 and has a reflectance phase dispersion of approximately $2.89 \times 10^{-5}$ radians/GHz.

TABLE 4

Prior Art Highly Reflective Reflector Design for GT Etalon Frequency Matched to the ITU Frequency Grid

| Layer # | Material | Refractive Index | Optical Thickness |
|---|---|---|---|
| Medium | Air | 1.000 | |
| 1 | Ta2O5 | 2.025 | 0.25 |
| 2 | SiO2 | 1.445 | 0.25 |
| 3 | Ta2O5 | 2.025 | 0.25 |
| 4 | SiO2 | 1.445 | 0.25 |
| 5 | Ta2O5 | 2.025 | 0.25 |
| 6 | SiO2 | 1.445 | 0.25 |
| 7 | Ta2O5 | 2.025 | 0.25 |
| 8 | SiO2 | 1.445 | 0.25 |
| 9 | Ta2O5 | 2.025 | 0.25 |
| 10 | SiO2 | 1.445 | 0.25 |
| 11 | Ta2O5 | 2.025 | 0.25 |
| 12 | SiO2 | 1.445 | 0.25 |
| 13 | Ta2O5 | 2.025 | 0.25 |
| 14 | SiO2 | 1.445 | 0.25 |
| 15 | Ta2O5 | 2.025 | 0.25 |
| 16 | SiO2 | 1.445 | 0.25 |
| 17 | Ta2O5 | 2.025 | 0.25 |
| 18 | SiO2 | 1.445 | 0.25 |
| 19 | Ta2O5 | 2.025 | 0.25 |
| 20 | SiO2 | 1.445 | 0.25 |
| 21 | Ta2O5 | 2.025 | 0.25 |
| 22 | SiO2 | 1.445 | 0.25 |
| 23 | Ta2O5 | 2.025 | 0.25 |
| 24 | SiO2 | 1.445 | 0.25 |
| 25 | Ta2O5 | 2.025 | 0.25 |
| Substrate | Fused Silica | 1.444 | |

When the prior art GT etalon of this composition is tuned to provide a resonance frequency at 194000 GHz, its free spectral range is 50.00845 GHz. This constitutes a substantial deviation of 0.00845 GHz from the desired free spectral range of 50.000 GHz Across 100 channels this error accumulates to 0.85 GHz, a significant deviation.

A GT etalon design of the present invention modifies the composition of the prior art GT etalon design by incorporating additional absentee layers in the second sequence of dielectric layers comprising the highly reflective reflector. Specifically, a GT etalon of the present invention retains the first reflector composition illustrated in Table 3. The inventive GT etalon design, however, modifies the composition of the highly reflective reflector by adding a Ta₂O₅ layer of 0.5 wave optical thickness between layers 1 and 2, and a second Ta₂O₅ layer of 0.5 wave optical thickness between layers 5 and 6. The modified highly reflective reflector design of the present invention is shown in Table 5.

TABLE 5

Highly Reflective Reflector Design for GT Etalon Frequency Matched to the ITU Frequency Grid

| Layer # | Material | Refractive Index | Optical Thickness |
|---|---|---|---|
| Medium | Air | 1.000 | |
| 1 | Ta2O5 | 2.025 | 0.25 |
| 1a | Ta2O5 | 2.025 | 0.50 |
| 2 | SiO2 | 1.445 | 0.25 |
| 3 | Ta2O5 | 2.025 | 0.25 |
| 4 | SiO2 | 1.445 | 0.25 |
| 5 | Ta2O5 | 2.025 | 0.25 |
| 5a | Ta2O5 | 2.025 | 0.50 |
| 6 | SiO2 | 1.445 | 0.25 |
| 7 | Ta2O5 | 2.025 | 0.25 |
| 8 | SiO2 | 1.445 | 0.25 |
| 9 | Ta2O5 | 2.025 | 0.25 |
| 10 | SiO2 | 1.445 | 0.25 |
| 11 | Ta2O5 | 2.025 | 0.25 |
| 12 | SiO2 | 1.445 | 0.25 |
| 13 | Ta2O5 | 2.025 | 0.25 |
| 14 | SiO2 | 1.445 | 0.25 |
| 15 | Ta2O5 | 2.025 | 0.25 |
| 16 | SiO2 | 1.445 | 0.25 |
| 17 | Ta2O5 | 2.025 | 0.25 |
| 18 | SiO2 | 1.445 | 0.25 |
| 19 | Ta2O5 | 2.025 | 0.25 |
| 20 | SiO2 | 1.445 | 0.25 |
| 21 | Ta2O5 | 2.025 | 0.25 |
| 22 | SiO2 | 1.445 | 0.25 |
| 23 | Ta2O5 | 2.025 | 0.25 |
| 24 | SiO2 | 1.445 | 0.25 |
| 25 | Ta2O5 | 2.025 | 0.25 |
| Substrate | Fused Silica | 1.444 | |

Although the reflector design illustrated in Table 5 retains a reflectance of approximately 99.95%, it has a value of the reflectance phase dispersion of approximately $5.09 \times 10^{-5}$ radians/GHz. When the GT etalon of the present invention is tuned to have a resonance frequency at 194000 GHz, its free spectral range is 50.00005 GTz. This etalon design matches the desired free spectral range to approximately 0.05 MHz. Across 100 channels this error accumulates to at most 0.01 GTz, a much less significant deviation than that observed in prior art GT etalons.

I claim:

1. An etalon optical interference filter comprising:
    a) a first reflector, having an internal end and an external end, said reflector comprising a first sequence of thin dielectric layers comprising alternating high and low indices of refraction layers and a absentee layer; and
    b) a second reflector positioned a selected distance from the internal end of said first reflector, having an internal end and an external end, said second reflector comprising a second sequence of thin dielectric layers comprising alternating high and low indices of refraction layers, wherein said first reflector and said second reflector are located in substantially parallel planes with respect to one another and thereby form a resonance cavity between the first reflector and the second reflector;
    wherein the position of said absentee layer in said first sequence of thin dielectric layers, composition of said absentee layer or both is selected to provide a selected cumulative reflectance phase dispersion, and wherein selection of the cumulative reflectance phase dispersion and the optical path length of said resonance cavity provides substantially independent control of the resonance frequency and free spectral range of said etalon optical interference filter.

2. The optical interference filter of claim 1 having a transmission spectrum comprising substantially periodic transmission bands.

3. The optical interference filter of claim 1 wherein the first sequence of thin dielectric layers comprises a plurality of said absentee layers and wherein the number of said absentee layers, the position of said absentee layers in the first sequence of thin dielectric layers or both are selected to provide a selected cumulative reflectance phase dispersion.

4. The optical interference filter of claim 1 wherein said second sequence of thin dielectric layers comprises an absentee layer wherein the position of said absentee layer in said second sequence of thin dielectric layers is selected to provide a selected cumulative reflectance phase dispersion.

5. The optical interference filter of claim 1 wherein the second sequence of thin dielectric layers comprises a plurality of absentee layers and wherein the number of said absentee layers, the position of absentee layers in the second sequence of thin dielectric layers or both are selected to provide a selected cumulative reflectance phase dispersion.

6. The optical interference filter of claim 1 wherein said absentee layers are substantially transparent to light having a frequency equal to the selected resonance frequency.

7. The optical interference filter of claim 1 wherein the cumulative reflectance phase dispersion is selected from the range of about $1\times10^{-5}$ rad/GHz to about $10\times10^{-5}$ rad/GHz.

8. The optical interference filter of claim 1 wherein the absentee layer is a metal oxide layer.

9. The optical interference filter of claim 1 wherein the absentee layer is selected from the group consisting of:
a) a glass layer;
b) a $Ta_2O_5$ layer;
c) a $SiO_2$ layer;
d) a $HfO_2$ layer;
e) a $TiO_2$ layer;
f) a $MgF_2$ layer;
g) a $CaF_2$ layer;
h) a $Nb_2O_5$ layer; and
i) a quartz layer.

10. The optical interference filter of claim 1 wherein said resonance cavity comprises an air gap cavity.

11. The optical interference filter of claim 10 wherein said first reflector comprises a first substrate layer and said second reflector comprises a second substrate layer.

12. The optical interference filter of claim 10 wherein the refractive index of said air gap cavity is selectively adjustable.

13. The optical interference filter of claim 10 wherein said air gap cavity is filled with one or more gases.

14. The optical interference filter of claim 1 wherein said resonance cavity comprises a dielectric cavity layer.

15. The optical interference filter of claim 14 wherein said dielectric cavity layer is a metal oxide layer.

16. The optical interference filter of claim 14 wherein said dielectric cavity layer is selected from the group consisting of:
a) a glass layer;
b) a fused silica layer;
c) a $Ta_2O_5$ layer;
d) a $SiO_2$ layer;
e) a $HFO_2$ layer;
f) a $TiO_2$ layer;
g) a $MgF_2$ layer;
h) a $CaF_2$ layer;
i) a $Nb_2O_5$ layer; and
j) a Si layer.

17. The optical interference filter of claim 1 wherein the optical path length of said resonance cavity is selected from the range of about 100 nm to about 10 mm.

18. The optical interference filter of claim 1 having a finesse selected from the range of about 3 to about 10.

19. The optical interference filter of claim 1 wherein the resonance frequency is about 194000 GHz and the free spectral range is about 100 GHz.

20. The optical interference filter of claim 1 wherein the resonance frequency is about 194000 GHz and the free spectral range is about 50 GHz.

21. The optical interference filter of claim 1 wherein the resonance frequency is about 194000 GHz and the free spectral range is about 25 GHz.

22. The optical interference filter of claim 1 wherein the resonance frequency is about 194000 GHz and the free spectral range is about 200 GHz.

23. The optical interference filter of claim 1 having a bandwidth selected from the range of about 100 MHz to about 100 GHz.

24. The optical interference filter of claim 1 wherein the optical thickness of each high index of refraction layer is about one quarter of the wavelength of light corresponding to the center resonance frequency of the first reflector, second reflector or both.

25. The optical interference filter of claim 1 wherein the optical thickness of each low index of refraction layer is about one quarter of the wavelength of light corresponding to the center resonance frequency of the first reflector, second reflector or both.

26. The optical interference filter of claim 1 wherein the internal and external ends of said first reflector and said second reflector are ultra flat optical surfaces.

27. The optical interference filter of claim 1 wherein the composition of the absentee layer is the same as the composition of the high refractive index layers.

28. The optical interference filter of claim 1 wherein the composition of the absentee layer is the same as the composition of the low refractive index layers.

29. The optical interference filter of claim 1 wherein the first reflector is slightly wedge shaped.

30. The optical interference filter of claim 1 wherein the second reflector is slightly wedge shaped.

31. The optical interference filter of claim 1 wherein the first reflector and the second reflector have about the same reflectance.

32. The optical interference filter of claim 1 wherein the first reflector and the second reflector have different reflectance.

33. The optical interference filter of claim 1 comprising a fixed wavelength filter.

34. The optical interference filter of claim 1 comprising a tunable wavelength filter.

35. The optical interference filter of claim 1 wherein the external ends of said first reflector and said second reflector have an antireflection coating.

36. The optical interference filter of claim 1 having a resonance frequency and the free spectral range frequency matched to a selected frequency standard.

37. The optical interference filter of claim 36 wherein the selected frequency standard is the International Telecommunication Union frequency standard.

38. The optical interference filter of claim 36 wherein the selected frequency standard comprise the emission lines of an optical source.

39. The optical interference filter of claim 1 wherein the selected cumulative reflectance phase dispersion is substantially linear with respect to frequency.

40. The optical interference filter of claim 1 wherein the selected cumulative reflectance phase dispersion is substantially nonlinear with respect to frequency.

41. An optical interference filter comprising a plurality of optical interference filters of claim 1 positioned to intersect a common propagation axis and located in substantially parallel planes with respect to one another.

42. The optical interference filter of claim 1 wherein said second reflector is a partially reflective reflector, and wherein said first reflector is a highly reflective reflector.

43. The optical interference filter of claim 42 herein the cumulative reflectance phase dispersion is selected to provide a substantially independent, selectable resonance frequency and free spectral range of the optical interference filter.

44. The optical interference filter of claim 42 having a transmission spectrum comprising substantially periodic transmission bands.

45. The optical interference filter of claim 42 wherein the first sequence of thin dielectric layers comprises a plurality of said absentee layers and wherein the number of said absentee layers, the position of said absentee layers in the first sequence of thin dielectric layers or both are selected to provide a selected cumulative reflectance phase dispersion.

46. The optical interference filter of claim 42 wherein said second sequence of thin dielectric layers comprises an absentee layer wherein the position of said absentee layer in said second sequence of thin dielectric layers is selected to provide a selected cumulative reflectance phase dispersion.

47. The optical interference filter of claim 42 wherein the second sequence of thin dielectric layers comprises a plurality of said absentee layers and wherein the number of said absentee layers, the position of said absentee layers in the second sequence of thin dielectric layers or both are selected to provide a selected cumulative reflectance phase dispersion.

48. The optical interference filter of claim 42 wherein said first reflector has a reflectance greater than 90%.

49. The optical interference filter of claim 42 wherein said first reflector reflects substantially all incident light.

50. An optical interference filter comprising:
a) a first reflector, having an internal end and an external end, said reflector comprising a first sequence of thin dielectric layers comprising alternating high and low indices of refraction layers and an absentee layer, wherein the thickness of said absentee layer is determined by the equation:

$$T_A = (m)\left(\frac{c}{2nv_c}\right);$$

wherein $T_A$ is the thickness of the absentee layer, m is a positive integer, n is the refractive index and $v_c$ is the center resonance frequency of the first reflector, second reflector or both; and b) a second reflector positioned a selected distance from the internal end of said first reflector, having an internal end and an external end, said second reflector comprising a second sequence of thin dielectric layers comprising alternating high and low indices of refraction layers, wherein said first reflector and said second reflector are located in substantially parallel planes with respect to one another and thereby form a resonance cavity between the first reflector and the second reflector; wherein the position of said absentee layer in said first sequence thin dielectric layers, composition of said absentee layer or both is selected to provide a selected cumulative reflectance chase dispersion.

51. A method of monitoring the frequency of light generated by an optical source comprising the steps:
a) passing light from said optical source through a beam splitter;
b) directing light reflected from said beam splitter through an optical interference filter, said optical interference filter comprising a first reflector and a second reflector, said first reflector having an internal end and an external end, and comprising a first sequence of thin dielectric layers comprising alternating high and low indices of refraction layers and a absentee layer, said second reflector positioned a selected distance from the internal end of said first reflector, having an internal end and an external end, said second reflector comprising a second sequence of thin dielectric layers comprising alternating high and low indices of refraction layers, wherein said first reflector and said second reflector are located in substantially parallel planes with respect to one another and thereby form a resonance cavity between the first reflector and the second reflector, wherein the position of said absentee layer in said first sequence of thin dielectric layers, composition of said absentee layer or both are selected to provide a selected cumulative reflectance phase dispersion, and wherein selection of the cumulative reflectance phase dispersion and the optical path length of said resonance cavity provides substantially independent control of the resonance frequency and free spectral range of said etalon optical interference filter; and
c) detecting light passed through said second reflector with a photodetector.

52. A method of tuning the frequency of light generated by an optical source comprising the steps:
a) passing light from said optical source through a first beam splitter;
b) directing light reflected from said first beam splitter through an optical interference filter, said optical interference filter comprising a first reflector and a second reflector, said first reflector having an internal end and an external end, and comprising a first sequence of thin dielectric layers comprising alternating high and low indices of refraction layers and a absentee layer, said second reflector or positioned a selected distance from the internal end of said first reflector, having an internal end and an external end, said second reflector comprising a second sequence of thin dielectric layers comprising alternating high and low indices of refraction layers, wherein said first reflector and said second reflector are located in substantially parallel planes with respect to one another and thereby form a resonance cavity between the first reflector and the second reflector, wherein the position of said absentee layer in said first sequence of thin dielectric layers, composition of said absentee layer or both are selected to provide a selected cumulative reflectance phase dispersion, and wherein selection of the cumulative reflectance phase dispersion and the optical path length of said resonance cavity provides substantially independent control of the resonance frequency and free spectral range of said etalon optical interference filter;
c) detecting light passed through said second reflector with a first photodetector, wherein a first signal is obtained;

d) passing light from said optical source through a second beam splitter;

e) detecting light reflected from second reflector with a second photodetector, wherein a second signal is obtained; and d) comparing the first signal and second signal and adjusting the operating conditions of said optical source to maintain a constant ratio of the first signal to second signal.

53. An etalon optical filter comprising:

a) a first reflector, having an internal end and an external end, said reflector comprising a first sequence of thin dielectric layers comprising alternating high and low indices of refraction and a high refractive index or low refractive index absentee layer having a first side and a second side, wherein said first side of said absentee layer is positioned next to a high index of refraction layer and wherein said second side of said absentee layer is positioned next to a low index of refraction layer; and b) a second reflector positioned a selected distance from the internal end of said first reflector, having an internal end and an external end, said second reflector comprising a second sequence of thin dielectric layers comprising alternating high and low indices of refraction layers, wherein said first reflector and said second reflector are located in substantially parallel planes with respect to one another and thereby form a resonance cavity between the first reflector and the second reflector;

wherein the position of said absentee layer in said first sequence of thin dielectric layers, composition of said absentee layer or both is selected to provide a selected cumulative reflectance phase dispersion and wherein selection of the cumulative reflectance phase dispersion and the optical path length of said resonance cavity provides substantially independent control of the resonance frequency and free spectral range of said etalon optical interference filter.

54. The etalon optical filter of claim 53 wherein said first and second sequences of thin dielectric layers comprise alternating high and low indices of refraction quarter wave layers.

55. The etalon optical filter of claim 54 wherein said quarter wave layers have optical thicknesses within about 10% of one quarter of the wavelength of light corresponding to the center resonance frequency of said first reflector.

56. The etalon optical filter of claim 53 wherein said absentee layer comprises a half wave layer.

57. The etalon optical filter of claim 56 wherein said half wave layer has an optical thickness within about 10% of one half of the wavelength of light corresponding to the center resonance frequency of said first reflector.

* * * * *